United States Patent
Toyoda

[11] Patent Number: 6,137,958
[45] Date of Patent: Oct. 24, 2000

[54] CAMERA

[75] Inventor: Yasuhiro Toyoda, Ohmiya, Japan

[73] Assignee: Canon Kabushiki Kaisha, Tokyo, Japan

[21] Appl. No.: 09/304,281

[22] Filed: May 3, 1999

[30] Foreign Application Priority Data

May 7, 1998 [JP] Japan .................................. 10-124690

[51] Int. Cl.[7] .............................. G03B 7/18; G03B 15/03
[52] U.S. Cl. ............................. 396/65; 396/166; 396/241; 396/276
[58] Field of Search ................................ 396/91, 93, 111, 396/125, 128, 89, 241, 166, 179, 155, 276, 65, 67, 69; 348/360, 361

[56] References Cited

U.S. PATENT DOCUMENTS

| | | |
|---|---|---|
| 3,766,841 | 10/1973 | Finnegan et al. .................... 396/241 X |
| 4,040,067 | 8/1977 | Kondo ...................................... 396/241 |
| 4,937,609 | 6/1990 | Wakabayashi et al. ............... 396/89 X |

*Primary Examiner*—W. B. Perkey
*Attorney, Agent, or Firm*—Robin, Blecker & Daley

[57] ABSTRACT

In a camera having a camera body part and a lens barrel part, an optical filter arranged to be rotatable around an axis located inside a lens optical path derived from the lens barrel part (for example, around an axis substantially parallel with an optical axis of the lens barrel part), and a filter rotating part having a drive source (for example, an electric motor) for rotating the optical filter are contained in the camera body part.

31 Claims, 15 Drawing Sheets

CAMERA

BACKGROUND OF THE INVENTION

1. Field of the Invention

The present invention relates to a camera having incorporated therein an optical filter for a photographic lens.

2. Description of Related Art

In a TTL single-lens reflex camera, which is arranged to guide light having passed through the photographic lens to a viewfinder, when the photographer intends to use a polarizing filter or the like, he or she screws and fixes a male screw of a mounting part of the polarizing filter or the like to a female screw provided on a fore end of a photographic lens barrel. With the polarizing filter or the like fixed to the photographic lens barrel, the photographer manually rotates the polarizing filter or the like around an axis parallel with the optical axis of the photographic lens while looking into the viewfinder of the camera (as some of the polarizing filters or the like are arranged to be rotatable with the mounting part thereof), and adjusts the rotated position of the polarizing filter or the like while confirming with his or her eye a viewfinder image to obtain a desired filter effect, before taking a photograph.

To solve the above inconveniences of mounting and demounting the filter, there has been proposed, in Japanese Laid-Open Patent Application No. Hei 8-334809, a camera in which a filter incorporated therein is arranged to be electrically driven to advance to the inside or retreat to the outside of an optical path of a photographic lens.

In addition, in Japanese Laid-Open Patent Application No. Hei 5-34116, there has been proposed such a technical art that two poralizing filters are disposed in a lens barrel of an interchangeable lens for the video camera or the like and one of the two poralizing filters is arranged to be rotated by an actuator so as to serially adjust the amount of light for the interchangeable lens (in particular, a mirror lens).

Further, since, in a lens-shutter camera, the optical axis of a photographic lens is provided separately from that of a viewfinder, the photographer cannot view image light having passed through the photographic lens and, therefore, cannot recognize, through the viewfinder, the effect of a polarizing filter or the like mounted on the fore end of a photographic lens barrel. Accordingly, the photographer need adjust the rotated position of the polarizing filter or the like by means of an index provided on a mounting frame of the polarizing filter or the like with the eye measurement, before taking a photograph.

In Japanese Laid-Open Utility Model Application No. Hei 3-60323, there has been proposed, in view of the above problem, a lens-shutter camera in which two polarizing filters that are rotatable in synchronism with each other are respectively provided on front surfaces of a photographic lens and a viewfinder. In such a camera, when the polarizing filter on the side of the photographic lens is rotated manually by the photographer, the polarizing filter on the side of the viewfinder is also synchronously rotated in the same direction, so that the photographer can recognize with the eye through the viewfinder the effect of the polarizing filter to be obtained during the taking of a photograph.

However, in the conventional TTL single-lens reflex camera, there is such an inconvenience that the photographer troublesomely must manually rotate the polarizing filter or the like to a desired position while always recognizing with the eye through the viewfinder the effect of the polarizing filter or the like. In addition, even if the photographer expects to have adjusted the rotated position of the polarizing filter or the like to such a position as to obtain the greatest filter effect, a little deviation would be necessarily caused, so that it is impossible to make the best use of the filter effect.

Further, in the case of a photo-taking operation requiring no polarizing filter or the like (for example, in the case of an object having low luminance, in a case where the effect of the polarizing filter or the like is little due to the backlighting situation or the like, or in a case where the amount of light emission resulting from a normal flash emission photo-taking operation is lost due to the presence of the polarizing filter or the like), the photographer troublesomely must remove the polarizing filter or the like with the hand upon his or her intention. Conversely, in the case of a photo-taking operation requiring the polarizing filter or the like suddenly, the photographer must perform such a very troublesome operation as to take out the polarizing filter or the like stored in a filter case and mount the polarizing filter or the like on the photographic lens barrel with the hand. Therefore, there are the great inconveniences of degrading the speedy photography and missing the shutter opportunity.

Further, in the cameras proposed in the above Japanese Laid-Open Patent Applications No. Hei 8-334809 and No. Hei 5-34116, even if it is possible to mount and demount the polarizing filter or the like incorporated in the camera by electrically driving the polarizing filter or the like to advance and retreat, the photographer troublesomely must operate a manual operation switch upon judging whether the polarizing filter or the like is required. In addition, if an electrical-driving advance/retreat mechanism for the polarizing filter or the like is provided in a lens barrel, a retreat space for making the filter entirely escape from the optical path as well as a space for the electrical-driving advance/retreat mechanism becomes necessary in a direction perpendicular to the optical axis. Therefore, a part of the lens barrel of the cylindrical shape would become greatly protrusive, so that there is the inconvenience of impairing an external design of the camera.

Further, if the mechanism for the filter is provided in the interchangeable lens, as proposed in the above Japanese Laid-Open Patent Application No. Hei 5-34116, the various filter mechanisms having the respective sizes which are individually adapted for the various interchangeable lenses of the TTL single-lens reflex camera system become necessary for obtaining the same filter effect. Therefore, there is the inconvenience of increasing the cost of the camera system.

Further, in most of the lens-shutter cameras, an external light measurement is employed in place of the TTL light measurement. Therefore, when the polarizing filter or the like is used, an exposure to be actually made on the film is obtained by light which is attenuated by passing through the polarizing filter, but a light measurement value of the camera remains unchanged. Accordingly, there is the inconvenience of making a taken photograph underexposed but for an exposure compensation.

Further, in most of the lens-shutter cameras, an external distance measurement is employed in place of the TTL distance measurement. Therefore, if the filter is inserted into the optical path of the photographic lens except for the front side of the photographic lens, a change in the optical path length would occur, so that the image forming position becomes different from that obtained when the filter is not inserted. Accordingly, there is the inconvenience of making the photographic lens out of focus if an automatic focus adjusting operation is performed without modifying distance measurement data obtained by the external light measurement.

Further, regardless of the TTL single-lens reflex camera or the lens-shutter camera, in a case where a close-up photography is performed mainly onto a plane-surface object (in particular, an object having a smooth surface) with flash light emission, the light emitted from a flash emitting device such as a stroboscope is reflected from the object and, then, is made to enter the inside of the photographic lens, so that highlight glare occurs. Accordingly, there is the inconvenience of making it impossible to take a sharp photograph.

BRIEF SUMMARY OF THE INVENTION

It is a first object of the invention to provide a camera which is capable of obtaining a desired filter effect without requiring the photographer to perform a filter rotating operation by the troublesome manual operation, and which is capable of obtaining an apposite exposure.

It is a second object of the invention to provide a camera which is capable of causing a filter to advance to and retreat from a lens optical path without requiring the photographer to perform a filter mounting/demounting operation by the troublesome manual operation, and which is made compact without impairing an external design of the camera.

It is a third object of the invention to provide a camera which is capable of causing a filter both to rotate and to advance to and retreat from a lens optical path without requiring the photographer to perform the troublesome manual operation, and which is capable of obtaining an apposite exposure.

It is a fourth object of the invention to provide a camera which is capable of causing a filter to rotate or to advance to and retreat from a lens optical path without requiring the photographer to perform the troublesome manual operation in a flash emitting photography other than the close-up photography, and which is capable of preventing underexposure or waste of energy.

It is a fifth object of the invention to provide a camera which is capable of causing a filter to rotate or to advance to and retreat from a lens optical path without requiring the photographer to perform the troublesome manual operation in a close-up flash emitting photography, and which is capable of suppressing an inconvenience caused by the reflection of flash emission.

It is a sixth object of the invention to provide a camera which is capable of preventing a focus on the object from deviating when a photo-taking operation is performed with a filter inserted into a lens optical path.

To attain the above objects, in accordance with a first aspect of the invention, there is provided a camera having a camera body part and a lens barrel part, the camera comprising an optical filter contained in the camera body part and arranged to be rotatable around an axis located inside a lens optical path derived from the lens barrel part, and filter rotating means contained in the camera body part and having a drive source for rotating the optical filter.

Further, in accordance with a second aspect of the invention, there is provided a camera having a camera body part and a lens barrel part, the camera comprising an optical filter contained in the camera body part, filter advance/retreat means contained in the camera body part and having a drive source for causing the optical filter to advance to and retreat from a lens optical path derived from the lens barrel part, and filter rotating means contained in the camera body part and having a drive source for rotating the optical filter having entered the lens optical path around an axis located inside the lens optical path.

Further, in accordance with a third aspect of the invention, there is provided a camera comprising filter advance/retreat means for causing an optical filter to advance to and retreat from a lens optical path, light measuring means for performing light measurement to measure luminance of an object field through the optical filter so as to obtain a light measurement result, and control means for causing the filter advance/retreat means to cause the optical filter to retreat from the lens optical path, when the light measurement result obtained by the light measuring means indicates a value less than a predetermined value.

Further, in accordance with a fourth aspect of the invention, there is provided a camera comprising a lens adapted for close-up photography, filter advance/retreat means for causing a polarizing filter to advance to and retreat from an optical path of the lens, flash emitting means, and control means for causing the filter advance/retreat means to cause the polarizing filter to enter the optical path of the lens when causing the flash emitting means to emit flash light during the close-up photography.

Further, in accordance with a fifth aspect of the invention, there is provided a camera comprising a lens adapted for close-up photography, filter rotating means for rotating a polarizing filter around an axis located inside an optical path of the lens, flash emitting means, and control means for, when causing the flash emitting means to emit flash light during the close-up photography, causing the filter rotating means to cause the polarizing filter to rotate to such a position as to cut off reflected light from an object field resulting from flash emission.

Further, in accordance with a sixth aspect of the invention, there is provided a camera comprising a lens adapted for close-up photography, filter advance/retreat means for causing a polarizing filter to advance to and retreat from an optical path of the lens, filter rotating means for rotating the polarizing filter around an axis located inside the optical path of the lens, flash emitting means, and control means for, when causing the flash emitting means to emit flash light during the close-up photography, causing the filter advance/retreat means to cause the polarizing filter to enter the optical path of the lens and causing the filter rotating means to cause the polarizing filter to rotate to such a position as to cut off reflected light from an object field resulting from flash emission.

In accordance with a seventh aspect of the invention, there is provided a camera comprising an optical filter capable of advancing to and retreating from an optical path of a lens, focus adjusting means for driving the lens to adjust focus in accordance with a result of distance measurement for an object, and distance measuring means for making a result of distance measurement for an object having a given distance different in accordance with an advancing/retreating state of the optical filter with respect to the optical path.

These and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the accompanying drawings.

Figure 1:
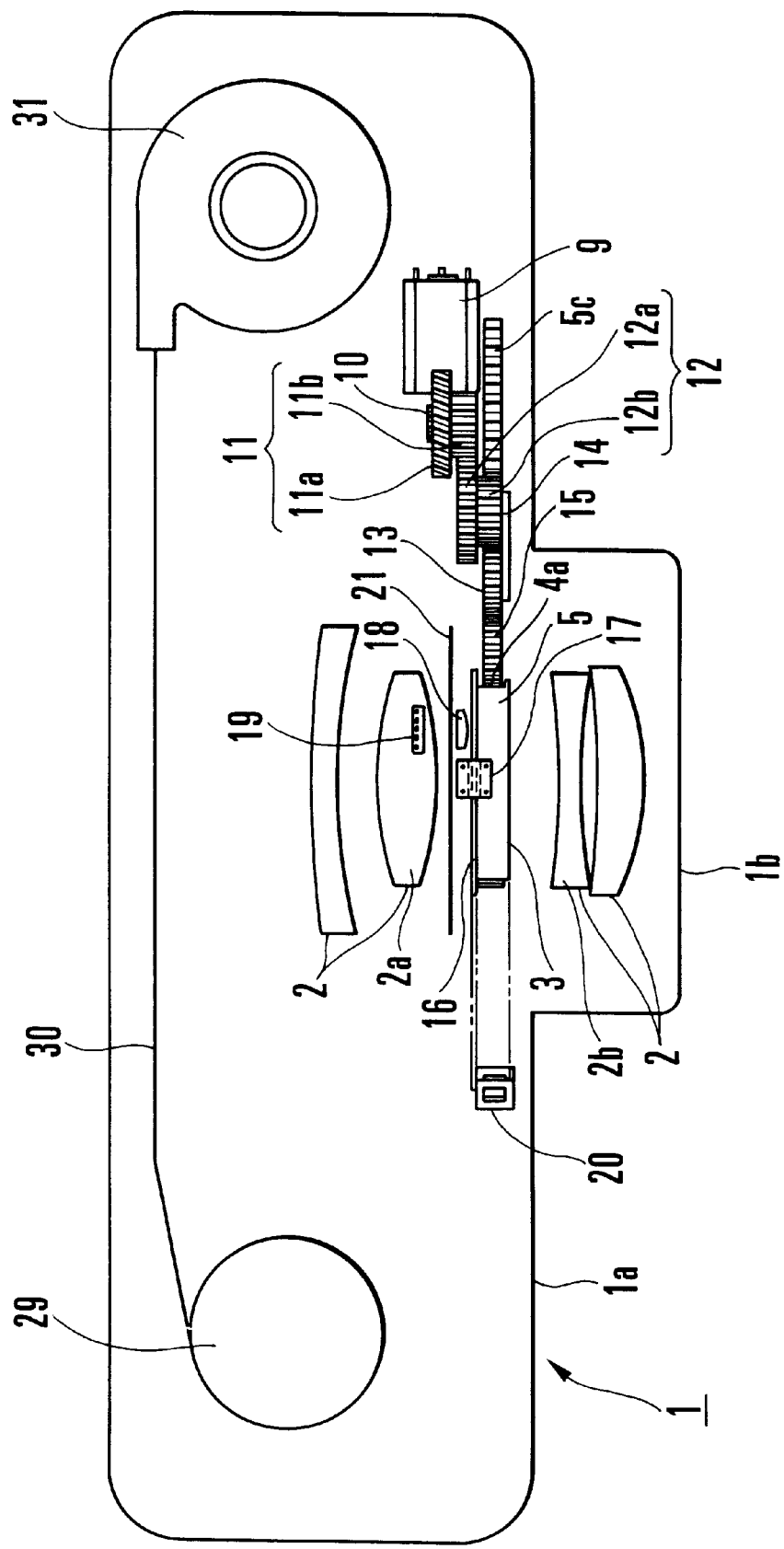
FIG. 1 is a plan view of the essential parts of a lens-shutter camera according to a first embodiment of the invention.
Figure 2:
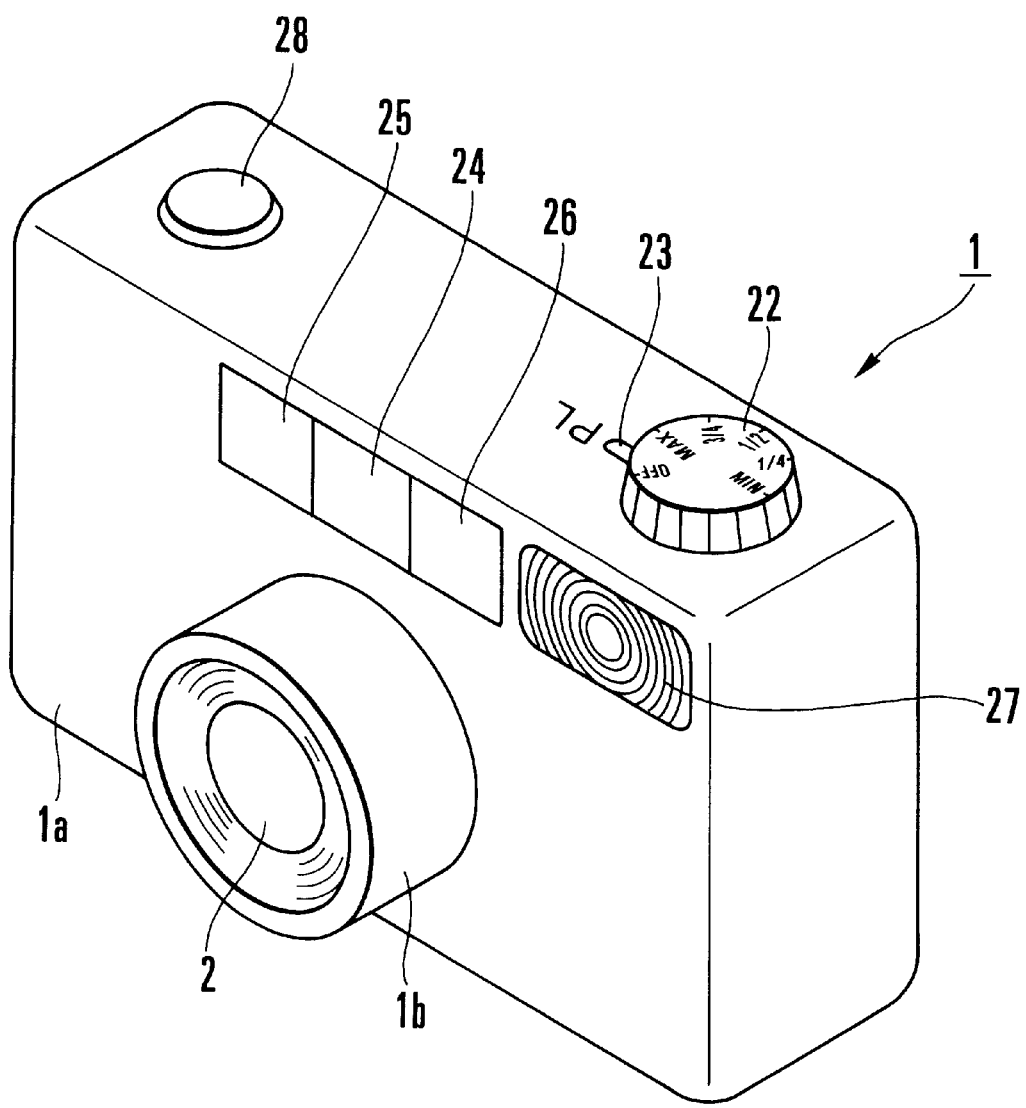
FIG. 2 is a perspective view of the appearance of the camera shown in FIG. 1.
Figure 3:
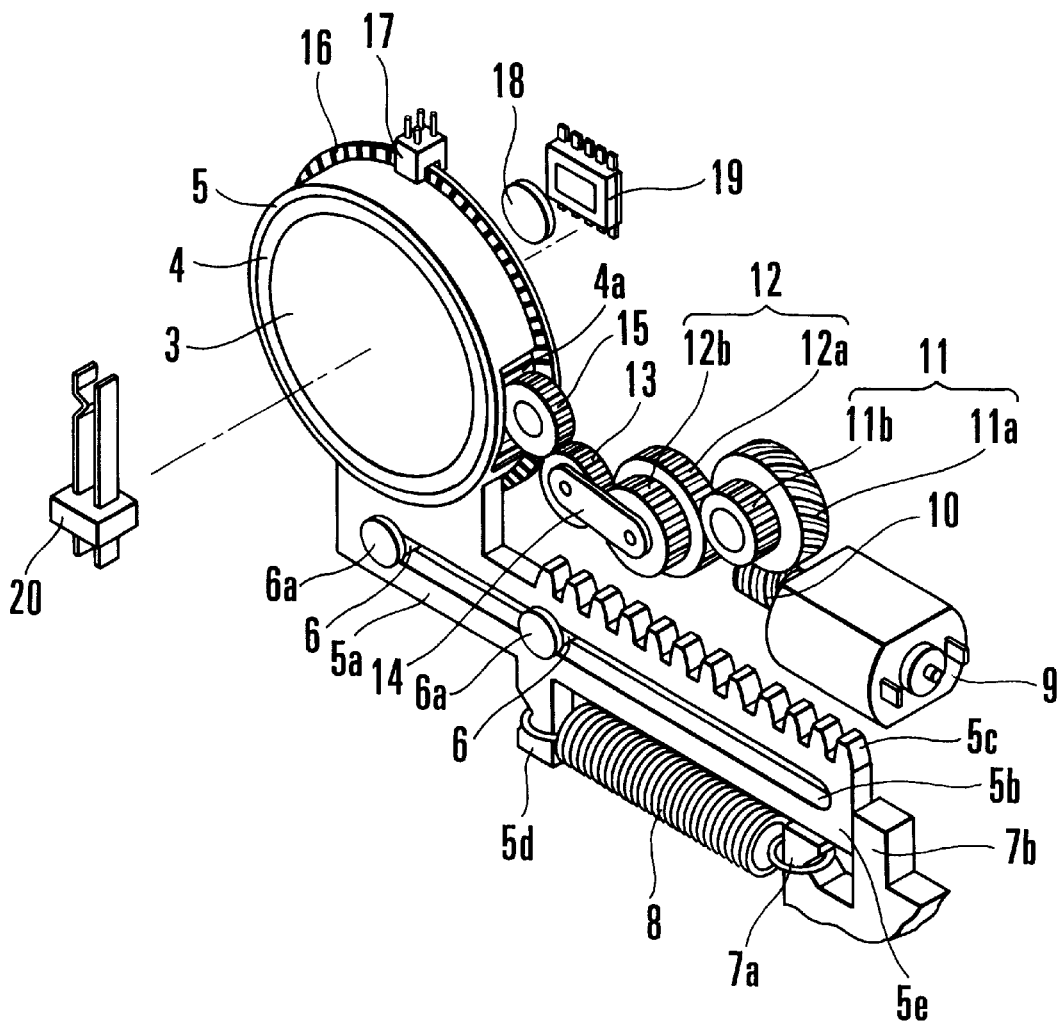
FIG. 3 is a perspective view of a filter driving mechanism of the camera shown in FIG. 1, showing a state in which a polarizing filter has entered an optical path of a photographic lens.
Figure 4:
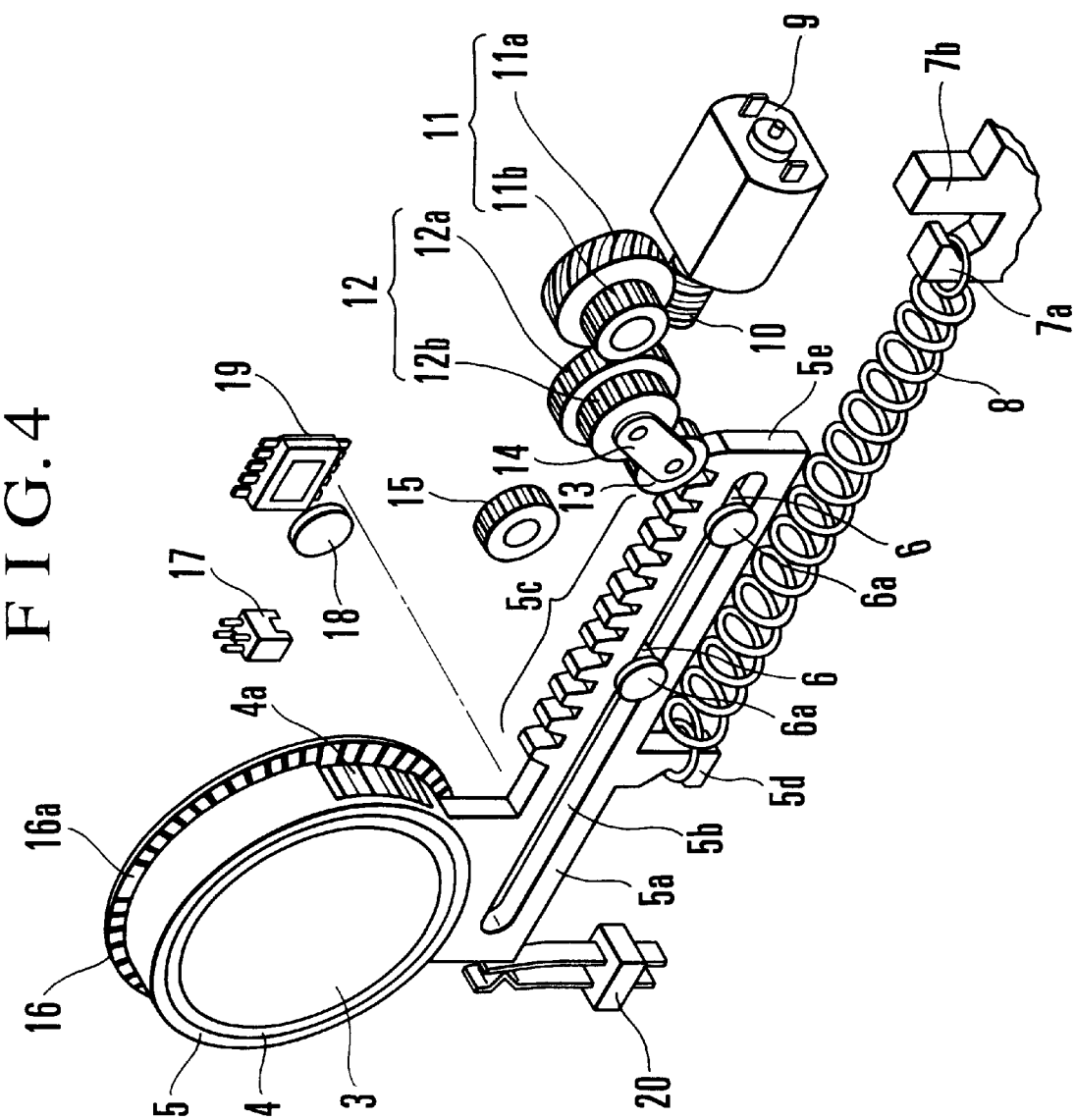
FIG. 4 is a perspective view of the filter driving mechanism of the camera shown in FIG. 1, showing a state in which the polarizing filter has retreated from the optical path of the photographic lens.
Figure 5:
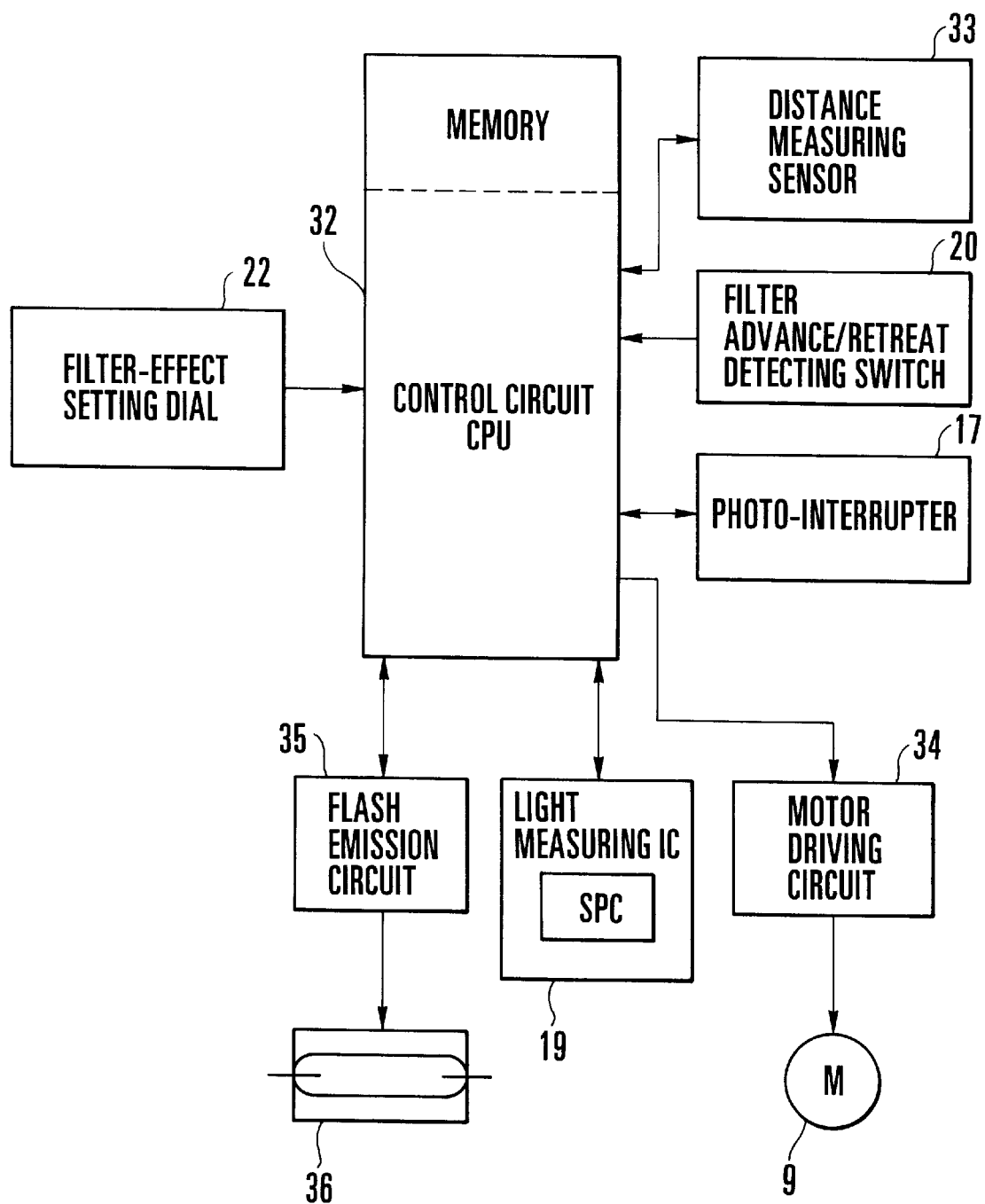
FIG. 5 is a block diagram showing the circuitry of the camera shown in FIG. 1.
Figure 6:
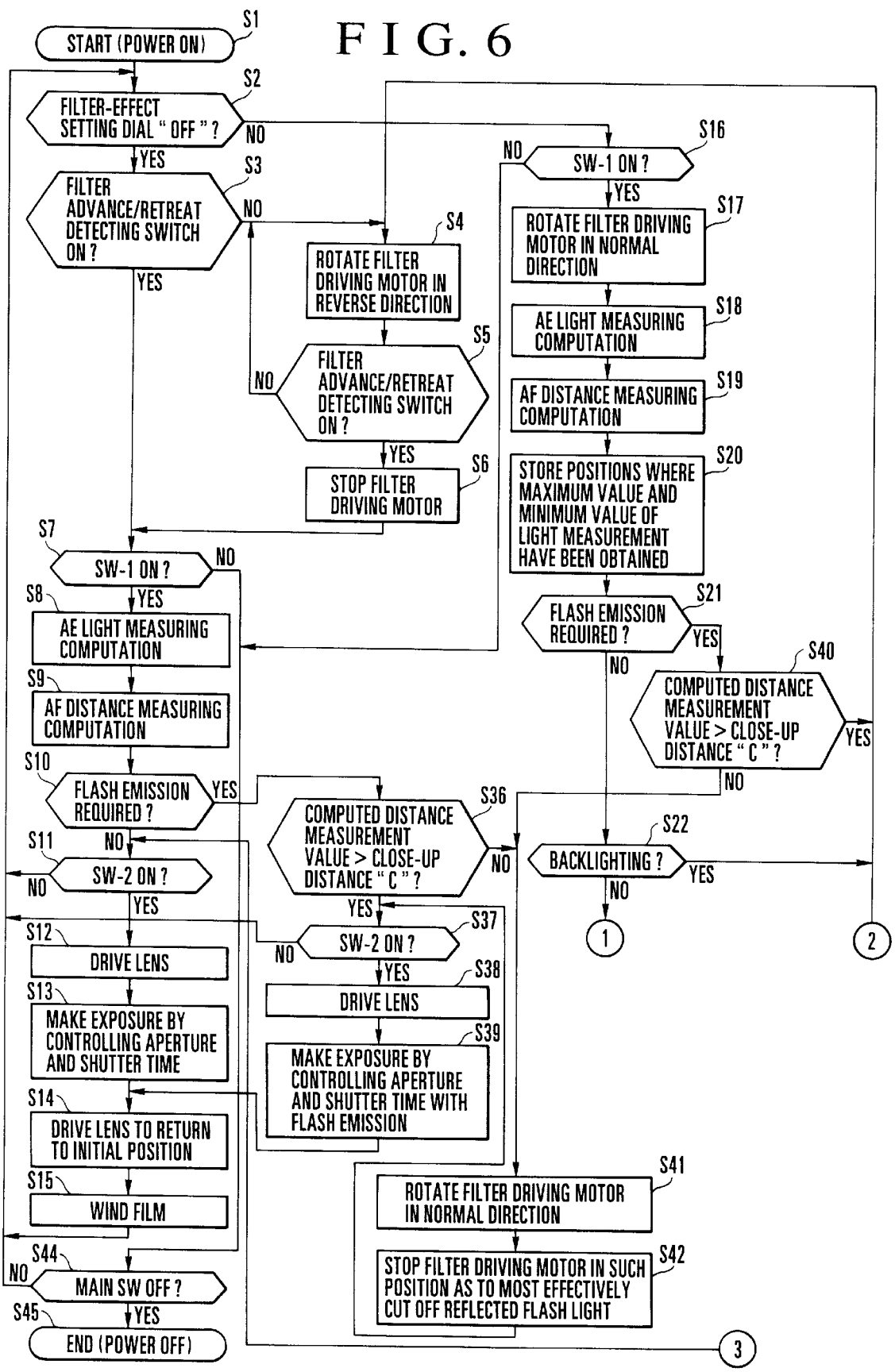
FIG. 6 is a flow chart showing the operation of the camera shown in FIG. 1.
Figure 7:
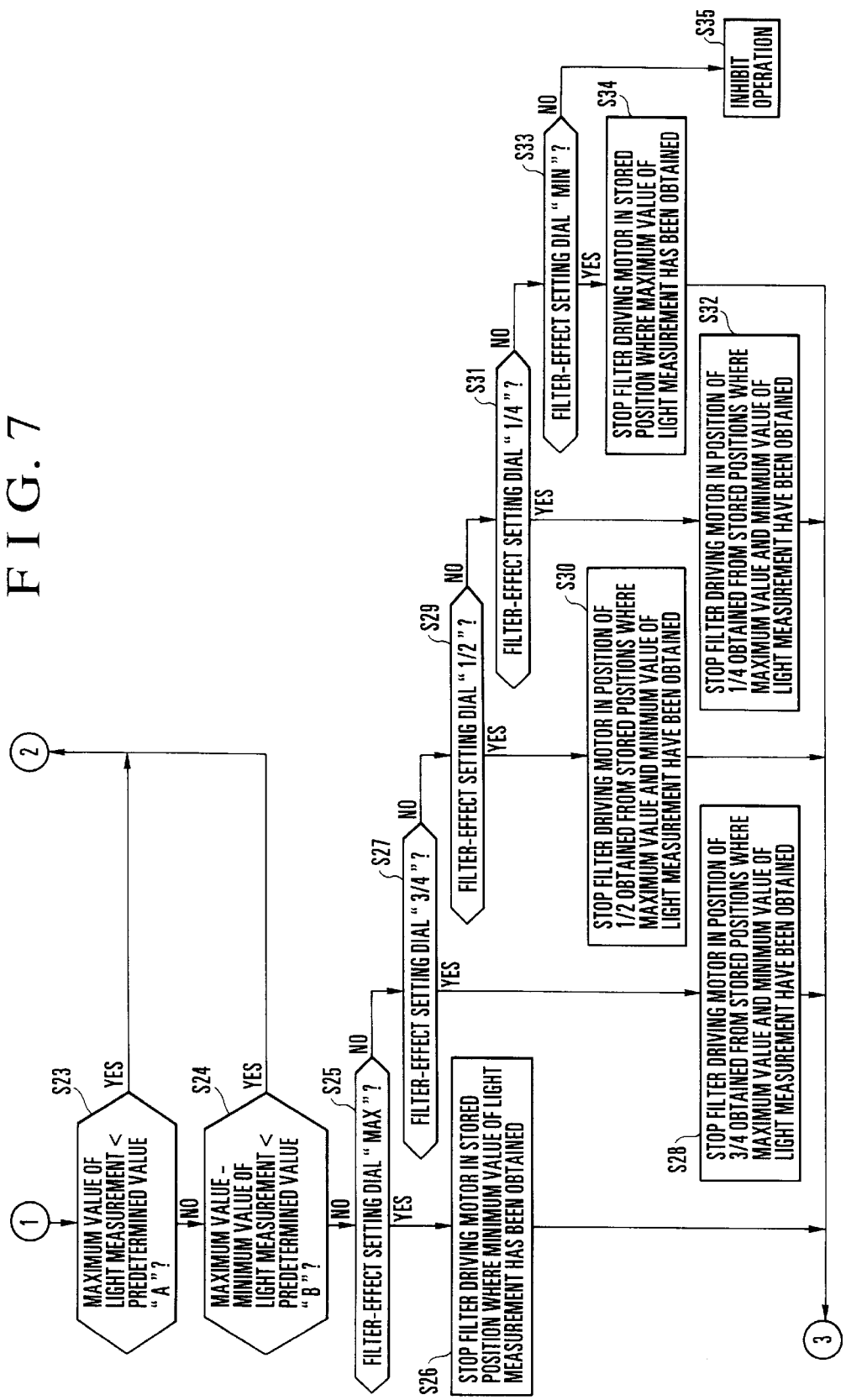
FIG. 7 is a flow chart showing the operation of the camera shown in FIG. 1.

FIGS. 1 to 7 show a lens-shutter camera according to a first embodiment of the invention. FIG. 1 is a diagram showing the arrangement of the essential parts of the lens-shutter camera as viewed from above. FIG. 2 is a perspective view showing the appearance of the lens-shutter camera. FIG. 3 is a perspective view of the essential parts of the lens-shutter camera in a state in which a filter has entered an optical path of a photographic lens. FIG. 4 is a perspective view of the essential parts of the lens-shutter camera in a state in which the filter has retreated from the optical path of the photographic lens. FIG. 5 is a block diagram showing constituents of the circuitry of the lens-shutter camera. FIGS. 6 and 7 are flow charts showing the operation of the lens-shutter camera.

Referring to FIGS. 1 to 4, reference numeral 1 denotes a lens-shutter camera, which is composed of a camera body part 1a in which all the essential elements shown in FIGS. 3 and 4 are contained and a lens barrel part 1b in which a part of a photographic lens 2 is contained. The photographic lens 2 is usable for close-up photography (macrophotography). Reference numeral 3 denotes a polarizing filter (optical filter).

The polarizing filter 3 is fixedly held by a filter holding frame 4. The filter holding frame 4 is supported, at the front side (object side) on the outer circumference thereof, by a filter supporting member 5 in such a way as to be rotatable around an axis parallel with the optical axis of the photographic lens 2. A gear (hereinafter referred to as the filter gear) 4a for receiving a rotating force is provided at the rear side (film surface side) on the outer circumference of the filter holding frame 4.

Reference numeral 5a shown in FIG. 3 denotes an advance/retreat guide part of the filter supporting member 5. In the advance/retreat guide part 5a, there is formed a slot 5b in which two guide pins 6 mounted on a camera body (not shown) and having the respective flanges 6a are fitted. The filter supporting member 5 is thus supported by the camera body in such a way as to be slidable in a direction perpendicular to the optical axis (toward the right and left sides of the camera) due to the fitting engagement between the guide pins 6 and the slot 5b, and in such a way as to be restricted from moving in the direction of the optical axis because of being sandwiched at a slight interval between the flanges 6a of the guide pins 6 and the camera body.

A rack gear 5c is provided at the upper end of the advance/retreat guide part 5a of the filter supporting member 5. A spring hook 5d is provided at the lower end of the advance/retreat guide part 5a of the filter supporting member 5. A spring hook 7a and a stopper 7b are provided at the camera body. When the right end 5e of the advance/retreat guide part 5a of the filter supporting member 5 abuts on the stopper 7b, as shown in FIG. 3, the center of rotation of the polarizing filter 3 approximately coincides with the optical axis of the photographic lens 2.

A tension coiled-spring 8 is hooked between the spring hooks 5d and 7a and is arranged to generate tension so as to cause the right end 5e of the advance/retreat guide part 5a and the stopper 7b to abut on each other in the state shown in FIG. 3.

A filter driving electromagnetic motor (hereinafter referred to as the filter driving motor) 9 is fixed to the camera body. A first two-stage gear 11 has a large, helical gear 11a, which meshes with a worm gear 10 of the filter driving motor 9, and a small gear 11b. A second two-state gear 12 has a large gear 12a, which meshes with the small gear 11b, and a small gear 12b, which serves as a sun gear meshing with a planet gear 13.

A planetary arm 14 is arranged to hold the planet gear 13 for revolution around the sun gear 12b. An idler gear 15 is arranged to connect the planet gear 13 and the filter gear 4a with each other. The gears 11, 12 and 15 are mounted on the camera body in such a way as to be rotatable. In accordance with the normal rotation or reverse rotation of the filter driving motor 9, the planet gear 13 revolves around the sun gear 12b clockwise or counterclockwise to mesh with the idler gear 15 or the rack gear 5c, so that a driving force for rotating the polarizing filter 3 or for causing the polarizing filter 3 to advance to or retreat from the optical path of the photographic lens 2 is transmitted to the idler gear 15 or the rack gear 5c.

Incidentally, the filter driving motor 9, the gears 10, 11, 12 and 13, the planetary arm 14, the idler gear 15 and the filter gear 4a constitute filter rotating means. The rack gear 5c, the tension coiled-spring 8, the filter driving motor 9, the gears 10, 11, 12 and 13 and the planetary arm 14 constitute filter advance/retreat means.

A phase plate 16 is fixed at the rear end of the filter holding frame 4 (behind the filter gear 4a) coaxially with the axis of rotation of the polarizing filter 3. The phase plate 16 is formed in a ring-like shape so as not to block the optical path of the polarizing filter 3. Further, the phase plate 16 is made of a thin film such as lith film, on which a repetitive pattern composed of light-transmitting parts and light-blocking parts is formed. Incidentally, reference numeral 16a shown in FIG. 4 denotes an initial-position-detecting light-transmitting part, which is formed to have a larger phase than that of the other light-transmitting part.

A photo-interrupter 17 is disposed just above the optical axis of the photographic lens 2 while sandwiching the phase plate 16, and is arranged to output a signal when each of the light-transmitting parts of the phase plate 16 is located inside the photo-interrupter 17 in accordance with the rotation of the polarizing filter 3 and to stop outputting the signal when each of the light-blocking parts of the phase plate 16 is located inside the photo-interrupter 17. Accordingly, a pulse signal equivalent to the rotation angle of the polarizing filter 3 is formed, so that the rotated position of the polarizing filter 3 is detected by counting the number of pulses of the pulse signal from the initial position by means of a control circuit 32 shown in FIG. 5.

A light measuring lens 18 and a light measuring sensor (SPC) 19 are disposed immediately behind the polarizing filter 3 (on the film surface side) and are arranged to measure object field light having passed through the polarizing filter 3. The light measuring sensor 19 has a backlighting detecting function of detecting separately an output of the central portion of the light receiving surface and an output of the peripheral portion thereof, and is formed integrally with a light measuring IC 19 as shown in FIG. 5. Incidentally, in the lens-shutter camera 1 according to the first embodiment, the space for disposing the light measuring sensor 19 is secured by cutting off the upper portion of a lens element 2a, which portion has little influence on the photo-taking image plane (a rectangular image plane long in the horizontal direction and short in the vertical direction). Further, the light measuring lens 18 and the light measuring sensor 19 are arranged to give no bad influence on photo-taking light and light measurement, due to the presence of a light-blocking tube (not shown).

A filter advance/retreat detecting switch 20 is arranged to turn off when the polarizing filter 3 has entered the optical path of the photographic lens 2 and to turn on when the polarizing filter 3 has retreated from the optical path.

A program-type lens shutter 21 serving both as a diaphragm and a shutter is disposed behind the polarizing filter 3 (on the film surface side), as shown in FIG. 1, in such a way as not to block the optical path for the light measuring sensor 19.

A filter-effect setting dial 22 provided on the top surface of the camera body part 1a as shown in FIG. 2 is rotatable by the photographer to selectively set the effect of the polarizing filter 3. Specifically, the filter-effect setting dial 22 is settable to a position "OFF" for causing the polarizing filter 3 to retreat from the optical path of the photographic lens 2, a position "MAX" for causing the polarizing filter 3 to enter the optical path of the photographic lens 2 and setting the polarizing filter 3 to such a rotated position as to obtain a maximum filter effect, a position "MIN" for setting the polarizing filter 3 to such a rotated position as to obtain a minimum filter effect, a position "½" for setting the polarizing filter 3 to such a rotated position as to obtain a filter effect which is one-half of the range between the maximum filter effect and the minimum filter effect, a position "¼" for setting the polarizing filter 3 to such a rotated position as to obtain a filter effect which is one fourth of the range between the maximum filter effect and the minimum filter effect, and a position "¾" for setting the polarizing filter 3 to such a rotated position as to obtain a filter effect which is three fourths of the range between the maximum filter effect and the minimum filter effect.

An index 23 which is used for selecting one of the above positions is provided adjacent to the filter-effect setting dial 22. On the appearance of the camera body part 1a, there are provided a viewfinder objective window 24, an autofocus light projecting window 25, an autofocus light receiving window 26, a flash emitting window 27 and a release button 28. In FIG. 1, there are also illustrated a film take-up spool 29, a film 30 and a film cartridge 31.

Referring to FIG. 5, the control circuit (CPU) 32 controls the whole of the camera and has the computing function of performing various computing operations on the basis of light measurement values obtained by the light measuring sensor 19 while rotating the polarizing filter 3, the memorizing function of storing the specific rotated positions of the polarizing filter 3, etc.

A distance measuring sensor 33, which is a position detecting element (PSD) or the like for use in the active-type autofocus, is arranged to receive reflected light from an object resulting from infrared light emitted from a light projecting element (iRED or the like) (not shown) and to output a signal corresponding to a position where the reflected light is received. The control circuit 32 computes a distance to the object on the basis the signal outputted from the distance measuring sensor 33 and drives a lens driving motor (not shown) to move a focus adjusting lens element 2b for focus adjustment. Thus, the distance measuring sensor 33, the control circuit 32 and the lens driving motor constitute focus adjusting means.

A motor driving circuit 34 is arranged to drive the filter driving motor 9. A flash emission circuit 35 is arranged to generate a high voltage for causing a flash device to emit flash light. A flash emitting part 36 is composed of a light emitting tube and a reflector.

Next, the control operation of the control circuit 32 will be described with reference to the flow charts of FIGS. 6 and 7. It is to be noted that, in the flow charts of FIGS. 6 and 7, portions having the same encircled numerals are connected with each other.

In step S1, when a main switch (not shown) is turned on, electric power is supplied to the camera and the photographic lens 2 is moved forward to a predetermined position, so that the camera is brought into a ready-for-photo-taking initial state.

In step S2, the control circuit 32 detects the setting state of the filter-effect setting dial 22. If the setting state of the filter-effect setting dial 22 indicates the position "OFF", the flow proceeds to step S3. If the setting state of the filter-effect setting dial 22 indicates any one of the positions "MAX", "¾", "½", "¼" and "MIN", the flow proceeds to step S16.

In step S3, the control circuit 32 detects the state of the filter advance/retreat detecting switch 20 to make a check to find if the polarizing filter 3 has surely retreated from the optical path of the photographic lens 2 (i.e., in the state shown in FIG. 4). If the switch 20 is found to be turned on, the flow proceeds to step S7 with determination that the polarizing filter 3 has retreated. If the switch 20 is found to be turned off, the flow proceeds to step S4 with determination that the polarizing filter 3 has still entered the optical path of the photographic lens 2 (i.e., in the state shown in FIG. 3).

In step S4, the motor control circuit 32 sends a command to the motor driving circuit 34 to cause the filter driving motor 9 to rotate in the reverse direction. The reverse rotating force of the filter driving motor 9 is transmitted to the first two-stage gear 11 through the worm gear 10. Then, from the state shown in FIG. 3, the first two-stage gear 11 rotates clockwise, the second two-stage gear 12 rotates counterclockwise, and the planet gear 13 revolves counterclockwise around the sun gear 12b. Accordingly, the planet gear 13, which has meshed with the idler gear 15 until now, is made to mesh with the rack gear 5c, and then continues rotating until the filter supporting member 5 is moved against the tension of the tension coiled-spring 8 to such a position that the polarizing filter 3 has completely retreated from the optical path of the photographic lens 2 (the state shown in FIG. 4).

In step S5, the control circuit 32 again detects the state of the filter advance/retreat detecting switch 20 to make a check to find if the polarizing filter 3 has surely retreated from the optical path of the photographic lens 2 (i.e., in the state shown in FIG. 4). If the switch 20 is found to be turned on, the flow proceeds to step S6 with determination that the polarizing filter 3 has retreated. If the switch 20 is found to be turned off, the process of step S4 is repeated with determination that the polarizing filter 3 has not yet retreated from the optical path of the photographic lens 2.

In step S6, the control circuit 32 sends a command to the motor driving circuit 34 to stop the filter driving motor 9, so that the filter driving motor 9 is brought to a stop. In this instance, such tension as to cause the polarizing filter 3 to advance to the optical path of the photographic lens 2 is made to act on the filter supporting member 5 by the tension coiled-spring 8. However, since the meshing engagement from the rack gear 5c to the worm gear 10 through the planet gear 13, the second two-stage gear 12 and the first two-stage gear 11 in this order is arranged in the speed increasing direction and the final stage of the speed increasing arrangement is the worm gear 10, there is no possibility that the filter driving motor 9 is reversely rotated by the tension of the spring 8. Therefore, the filter supporting member 5 is held in position in the state shown in FIG. 4.

Incidentally, if a case where large shock happens to be applied to the camera to break the meshing engagement of the above gears is into consideration, such a lock mechanism as to lock and hold the advance/retreat guide part 5a of the filter supporting member 5 in the state shown in FIG. 4 and to unlock the advance/retreat guide part 5a in response to the normal rotation of the filter driving motor 9 may be provided. Subsequently, the flow proceeds to step S7.

In step S7, the control circuit 32 makes a check to find if a switch SW-1 is turned on with the release button 28 pushed up to the first stroke thereof. If so, the flow proceeds to step S8. If not, the flow jumps to step S44.

In step S8, the control circuit 32 takes in a light measurement output of the light measuring sensor 19 formed integrally with the light measuring IC, and performs an AE light measuring computation to decide an exposure control value.

In step S9, the control circuit 32 causes the light projecting element iRED (not shown) to light up to project light onto an object, takes in an output of the distance measuring sensor (PSD) 33 which has received reflected infrared light from the object, and performs an AF distance measuring computation to decide the amount of driving of the photographic lens 2 for focus adjustment.

In step S10, in a case where a flash-emission auto-setting mode is selected by a flash mode setting means (not shown) and the luminance of the object is found by the AE light measuring computation in step S8 to be so low as to require the flash emission, or in a case where a flash-emission forcing mode is selected by the flash mode setting means, the control circuit 32 determines to perform the flash emission. Then, the flow proceeds to step S36. If the control circuit 32 determines not to perform the flash emission, the flow proceeds to step S11.

In step S1, the control circuit 32 makes a check to find if a switch SW-2 is turned on with the release button 28 pushed up to the second stroke thereof. If so, the flow proceeds to step S12. If not, the flow returns to step S2.

In step S12, the control circuit 32 drives the photographic lens 2 (the focus adjusting lens element 2b) on the basis of the amount of driving of the photographic lens 2 obtained as a result of the AF distance measuring computation in step S9, thereby performing focus adjustment.

In step S13, the control circuit 32 controls the aperture and shutter time of the lens shutter 21 on the basis of the exposure control value decided in step S8, thereby performing exposure.

In step S14, after completion of the exposure, the control circuit 32 causes the photographic lens 2 which has been driven for focus adjustment to return to the initial position thereof.

In step S15, the control circuit 32 causes the film 30 to be wound for one frame portion thereof so as to make preparation for the next photo-taking operation. After completion of the winding of the film 30, the flow returns to step S2.

In step S16, after it is found that the filter-effect setting dial 22 is set to any position other than the position "OFF", the control circuit 32 makes a check to find if the switch SW-1 has been turned on with the release button 28 pushed to the first stroke thereof. If so, the flow proceeds to step S17. If not, the flow jumps to step S44.

In step S17, the motor control circuit 32 sends to the motor control circuit 34 a command to cause the filter driving motor 9 to rotate in the normal direction. The normal rotating force of the filter driving motor 9 is transmitted to the first two-stage gear 11 through the worm gear 10. Then, in a case where the beginning is the state shown in FIG. 4, the first two-stage gear 11 rotates counterclockwise, the second two-stage gear 12 rotates clockwise, and the planet gear 13 revolves clockwise around the sun gear 12b.

Accordingly, the planet gear 13, which has meshed with the rack gear 5c, disengages from the rack gear 5c and, then, meshes with the idler gear 15. At the same time, the filter supporting member 5, which is pulled by the tension coiled-spring 8, moves up to a position where the right end 5e of the advance/retreat guide part 5a abuts on the stopper 7b. Accordingly, the polarizing filter 3 enters the predetermined position inside the optical path of the photographic lens 2, and the filter gear 4a is made to mesh with the idler gear 15, so that the state shown in FIG. 3 is realized. Incidentally, in a case where the beginning is the state shown in FIG. 3, the above operation beginning from the state shown in FIG. 4 does not occur.

Even after that, the filter driving motor 9 is made to continue rotating in the normal direction to cause the filter gear 4a to rotate counterclockwise. In accordance with the rotation of the filter gear 4a, the polarizing filter 3, which is held by the filter holding frame 4 formed integrally with the filter gear 4a, rotates counterclockwise around an axis which approximately coincides with the optical axis of the photographic lens 2.

In step S18, the control circuit 32, while rotating the polarizing filter 3, takes in a light measurement output of the light measuring sensor 19, which has received object light having passed through the polarizing filter 3, and performs the AE light measuring computation.

In step S19, at the same time with step S18, the control circuit 32 causes the light projecting element (iRED, not shown) to emit light to be projected onto the object and, then, takes in an output of the distance measuring sensor (PSD) 33, which has received reflected infrared light from the object. Then, the control circuit 32 performs the AF distance measuring computation while making a correction, taking into consideration a change of the photo-taking optical path length caused by inserting the polarizing filter 3 into the photographic lens 2, and decides the amount of driving of the photographic lens 2.

In step S20, at the same time with steps S18 and S19, the control circuit 32 detects and computes a maximum value and a minimum value from among light measurement outputs of the light measuring sensor 19, correlates each light measurement output with the count number of pulses obtained by the photo-interrupter 17 from the initial position, and stores the respective rotated positions of the polarizing filter 3 obtained when the light measurement output has indicated the maximum value and the minimum value.

In step S21, in a case where the flash-emission forcing mode is selected by the flash mode setting means, the control circuit 32 determines to perform the flash emission. Then, the flow proceeds to step S40. If the control circuit 32 determines not to perform the flash emission, the flow proceeds to step S22.

In step S22, in a case where, in the AE light measuring computation in step S18, the difference between light measurement outputs of the central portion and the peripheral portion of the light receiving surface of the light measuring sensor (SPC) 19 is grater than a predetermined value, the control circuit 32 determines that the current photo-taking operation is made for the backlighting photography, which receives little effect from the polarizing filter 3. Then, the flow returns to step S4 to cause the polarizing filter 3 to retreat from the optical path of the photographic lens 2. If it is determined that the current photo-taking operation is not made for the backlighting photography, the flow proceeds to step S23.

In step S23, the control circuit 32 makes a check to find if the maximum value of the light measurement outputs obtained in the AE light measuring computation in step S18 with the polarizing filter 3 inserted is less than a predetermined value "A". If so, the control circuit 32 determines that the current photo-taking operation is made for the low-luminance object photography and the flash emission is required because the photo-taking operation without the flash emission makes the shutter exposure time too long, causing the possibility of camera-shake. Then, the flow returns to step S4 to cause the polarizing filter 3 to retreat from the optical path of the photographic lens 2. If it is found that the maximum value is not less than the predetermined value "A", the flow proceeds to step S24.

In step S24, the control circuit 32 makes a check to find if the difference between the maximum value and the minimum value of the light measurement outputs obtained in the AE light measuring computation in step S18 with the polarizing filter 3 inserted is less than a predetermined value "B". If so, the control circuit 32 determines that the effect of the polarizing filter 3 is little. Then, the flow returns to step S4 to cause the polarizing filter 3 to retreat from the optical path of the photographic lens 2. If it is found that the difference is not less than the predetermined value "B", the flow proceeds to step S25.

In step S25, the control circuit 32 detects the setting state of the filter-effect setting dial 22 to find if the filter-effect setting dial 22 is set to the position "MAX". If so, the flow proceeds to step S26. If not, the flow proceeds to step S27.

In step S26, the control circuit 32 sends a control signal to the motor driving circuit 34 so as to set the polarizing filter 3 to the position stored in step S20 where the light measurement output has indicated the minimum value, i.e., where the effect of the polarizing filter 3 is greatest. Then, the control circuit 32 counts pulses outputted from the photo-interrupter 17 from the initial position, and stops driving the filter driving motor 9 at a point of time where the desired rotated position of the polarizing filter 3 has been obtained. After that, the flow proceeds to step S11.

In step S27, the control circuit 32 detects the setting state of the filter-effect setting dial 22 to find if the filter-effect setting dial 22 is set to the position "¾". If so, the flow proceeds to step S28. If not, the flow proceeds to step S29.

In step S28, the control circuit 32 divides into four equal parts the rotation angle of the polarizing filter 3 between the position stored in step S20 where the light measurement output has indicated the minimum value and the position stored in step S20 where the light measurement output has indicated the maximum value, and sends a control signal to the motor driving circuit 34 so as to set the polarizing filter 3 to the position where the effect of the polarizing filter 3 is second greatest, i.e., the position near to the minimum value among the four equal parts (the effect of the polarizing filter 3 corresponds to three fourths of the range from the maximum value to the minimum value). Then, the control circuit 32 counts pulses outputted from the photo-interrupter 17 from the initial position, and stops driving the filter driving motor 9 at a point of time where the desired rotated position of the polarizing filter 3 has been obtained. After that, the flow proceeds to step S11.

In step S29, the control circuit 32 detects the setting state of the filter-effect setting dial 22 to find if the filter-effect setting dial 22 is set to the position "½". If so, the flow proceeds to step S30. If not, the flow proceeds to step S31.

In step S30, the control circuit 32 divides into four equal parts the rotation angle of the polarizing filter 3 between the position stored in step S20 where the light measurement output has indicated the minimum value and the position stored in step S20 where the light measurement output has indicated the maximum value, and sends a control signal to the motor driving circuit 34 so as to set the polarizing filter 3 to the position where the effect of the polarizing filter 3 is medium, i.e., the middle position among the four equal parts (the effect of the polarizing filter 3 corresponds to one half of the range from the maximum value to the minimum value). Then, the control circuit 32 counts pulses outputted from the photo-interrupter 17 from the initial position, and stops driving the filter driving motor 9 at a point of time where the desired rotated position of the polarizing filter 3 has been obtained. After that, the flow proceeds to step S11.

In step S31, the control circuit 32 detects the setting state of the filter-effect setting dial 22 to find if the filter-effect setting dial 22 is set to the position "¼". If so, the flow proceeds to step S32. If not, the flow proceeds to step S33.

In step S32, the control circuit 32 divides into four equal parts the rotation angle of the polarizing filter 3 between the position stored in step S20 where the light measurement output has indicated the minimum value and the position stored in step S20 where the light measurement output has indicated the maximum value, and sends a control signal to the motor driving circuit 34 so as to set the polarizing filter 3 to the position where the effect of the polarizing filter 3 is second least, i.e., the position near to the maximum value among the four equal parts (the effect of the polarizing filter 3 corresponds to one fourth of the range from the maximum value to the minimum value). Then, the control circuit 32 counts pulses outputted from the photo-interrupter 17 from the initial position, and stops driving the filter driving motor 9 at a point of time where the desired rotated position of the polarizing filter 3 has been obtained. After that, the flow proceeds to step S11.

In step S33, the control circuit 32 detects the setting state of the filter-effect setting dial 22 to find if the filter-effect setting dial 22 is set to the position "MIN". If so, the flow proceeds to step S34. If not, the flow proceeds to step S35.

In step S34, the control circuit 32 sends a control signal to the motor driving circuit 34 so as to set the polarizing filter 3 to the position stored in step S20 where the light measurement output has indicated the maximum value, i.e., where the effect of the polarizing filter 3 is least. Then, the control circuit 32 counts pulses outputted from the photo-interrupter 17 from the initial position, and stops driving the filter driving motor 9 at a point of time where the desired rotated position of the polarizing filter 3 has been obtained. After that, the flow proceeds to step S11.

In step S35, in a case where any of the above dial positions has not been able to be detected in steps S25, S27, S29, S31 and S33, the control circuit 32 determines that a trouble such as failure in contact has occurred in the filter-effect setting dial 22, and sends a control signal to the motor driving circuit 34 to return the polarizing filter 3 to the initial position, which was taken before the rotation thereof, while detecting pulses outputted from the photo-interrupter 17. After that, the control circuit 32 inhibits the operation of the camera.

In step S36, after determining that the flash emission is required in step S10, the control circuit 32 makes a check to find if a distance measurement value obtained in the AF distance measuring computation in step S9 is greater than a predetermined close-up distance "C" which is set for the macrophotography area. If so, the control circuit 32 regards the current photo-taking operation as a normal distance photography, so that the flow proceeds to step S37. If not, the control circuit 32 regards the current photo-taking operation as a close-up distance photography (macrophotography), so that the flow proceeds to step S41.

In step S37, the control circuit 32 makes a check to find if the switch SW-2 is turned on with the release button 28 pushed up to the second stroke thereof. If so, the flow proceeds to step S38. If not, the flow returns to step S2.

In step S38, the control circuit 32 drives the photographic lens 2 (the focus adjusting lens element 2*b*) to adjust the focus thereof on the basis of the amount of driving of the photographic lens 2 obtained as a result of the AF distance measuring computation in step S9 if the flow has come through step S9 or on the basis of the amount of driving of the photographic lens 2 obtained as a result of the AF distance measuring computation in step S19 if the flow has come through step S19.

In step S39, the control circuit 32 controls the aperture and shutter time of the lens shutter 21 and causes the flash device to emit light so as to make an exposure, on the basis of the exposure control value decided in step S8 if the flow has come through step S8 or on the basis of the exposure control value decided in step S18 if the flow has come through step S18. After that, the flow proceeds to step S14.

In step S40, after determining that the flash emission is required in step S21, the control circuit 32 makes a check to find if a distance measurement value obtained in the AF distance measuring computation in step S19 is greater than the predetermined close-up distance "C" which is set for the macrophotography area. If so, the control circuit 32 regards the current photo-taking operation as a normal distance photography, so that the flow returns to step S4 to cause the polarizing filter 3 to retreat from the optical path of the photographic lens 2. If not, the control circuit 32 regards the current photo-taking operation as a close-up distance photography (macrophotography), so that the flow returns to step S41.

In step S41, the motor control circuit 32 sends to the motor control circuit 34 a command to cause the filter driving motor 9 to rotate in the normal direction. The normal rotating force of the filter driving motor 9 is transmitted to the first two-stage gear 11 through the worm gear 10. Then, in a case where the beginning is the state shown in FIG. 4 while the flow has come through step S36, the first two-stage gear 11 rotates counterclockwise, the second two-stage gear 12 rotates clockwise, and the planet gear 13 revolves clockwise around the sun gear 12*b*. Accordingly, the planet gear 13, which has meshed with the rack gear 5*c*, disengages from the rack gear 5*c* and, then, meshes with the idler gear 15.

At the same time, the filter supporting member 5, which is pulled by the tension coiled-spring 8, moves up to a position where the right end 5*e* of the advance/retreat guide part 5*a* abuts on the stopper 7*b*. Accordingly, the polarizing filter 3 enters the predetermined position inside the optical path of the photographic lens 2, and the filter gear 4*a* is made to mesh with the idler gear 15, so that the state shown in FIG. 3 is realized. Incidentally, in a case where the beginning is the state shown in FIG. 3 while the flow has come through step S40, the above operation beginning from the state shown in FIG. 4 does not occur.

Even after that, the filter driving motor 9 is made to continue rotating in the normal direction to cause the filter gear 4*a* to rotate counterclockwise. In accordance with the rotation of the filter gear 4*a*, the polarizing filter 3, which is held by the filter holding frame 4 formed integrally with the filter gear 4*a*, rotates counterclockwise around an axis which approximately coincides with the optical axis of the photographic lens 2.

In step S42, the control circuit 32 sends a control signal to the motor driving circuit 34 to set the polarizing filter 3 to such a rotated position as to most effectively prevent the light emitted from the flash device from entering the photographic lens 2 after being reflected from a close object (mainly, a plane-surface object such as copy, particularly, having a smooth surface). Incidentally, the above rotated position is decided almost by the positional relationship between the object and the flash device incorporated in the camera and is beforehand stored in a memory incorporated in the camera.

Then, the control circuit 32 counts pulses outputted from the photo-interrupter 17 from the initial position, and stops driving the filter driving motor 9 at a point of time where the desired rotated position of the polarizing filter 3 has been obtained. After that, the flow proceeds to step S37.

In step S44, the control circuit 32 detects the state of the main switch (not shown). If the main switch is detected to be turned on, the flow returns to step S2 to repeat the above operation. If the main switch is detected to be turned off, the flow proceeds to step S45.

In step S45, the control circuit 32 causes the photographic lens barrel to move backward, shuts off the power supply of the camera and brings the flow to an end.

As has been described above, according to the first embodiment, since the polarizing filter 3, the filter rotating means and the filter advance/retreat means are contained in the camera body part 1a, it is possible to dispense with a filter rotating operation or filter mounting/demounting operation by a manual operation, which is troublesome. In addition, since the polarizing filter 3, the filter rotating means and the filter advance/retreat means are disposed in the camera body part 1a in which a space can be easily secured in a direction perpendicular to the optical axis of the photographic lens 2, it is possible to prevent the increase in cost of the camera system or the failure of an external design of the camera.

Further, according to the first embodiment, the filter driving motor 9 is used as a drive source for both the filter rotating means and the filter advance/retreat means, it is possible to further decrease the cost of the camera system and to realize a more compact camera.

Further, according to the first embodiment, the polarizing filter 3 is set to the rotated position (stored position) obtained when the light measurement output has taken the minimum value, or the rotated position of the polarizing filter 3 is controlled according to the setting of the degree of effect of the polarizing filter 3 by the filter-effect setting dial 22 on the basis of the rotated positions (stored positions) obtained when the light measurement outputs have taken the maximum value and the minimum value. Therefore, it is possible to automatically rotate the polarizing filter 3 to such a position as to obtain an apposite filter effect, thereby facilitating obtaining a correct exposure with ease.

Further, according to the first embodiment, in a case where the filter effect is little or it is preferable to have no filter effect, for example, when the maximum value of the light measurement is less than the predetermined value "A", when the difference between the maximum value and the minimum value of the light measurement is less than the predetermined value "B", or when the current photo-taking operation is made for the backlighting photography, the polarizing filter 3 is made to automatically retreat from the optical path of the photographic lens 2. Therefore, it is possible to surely prevent the amount of light usable for exposure from being wastefully reduced by the polarizing filter 3 or to surely prevent an under-exposed photograph from being taken.

Further, according to the first embodiment, when a normal photography other than a close-up photography is performed along with the flash emission, the polarizing filter 3 is made to retreat from the optical path of the photographic lens 2. Therefore, it is possible to surely prevent an under-exposed photograph from being taken notwithstanding the flash emission or to surely prevent energy from being wastefully consumed.

Further, when a close-up photography is performed along with the flash emission, the polarizing filter 3 is made to be set to such apposition as to effectively cut off reflected light resulting from the flash emission. Therefore, it is possible to prevent the strong reflected light resulting from the flash emission from entering the optical path of the photographic lens 2, thereby enabling a good close-up flash photography to be performed.

Further, according to the first embodiment, when the photo-taking operation is performed with the polarizing filter 3 inserted into the optical path of the photographic lens 2, the result of the distance measurement is appropriately modified by, for example, correcting the result of the distance measurement obtained when the polarizing filter 3 has retreated. Therefore, it is possible to surely prevent a defocus on the object.

Figure 8:
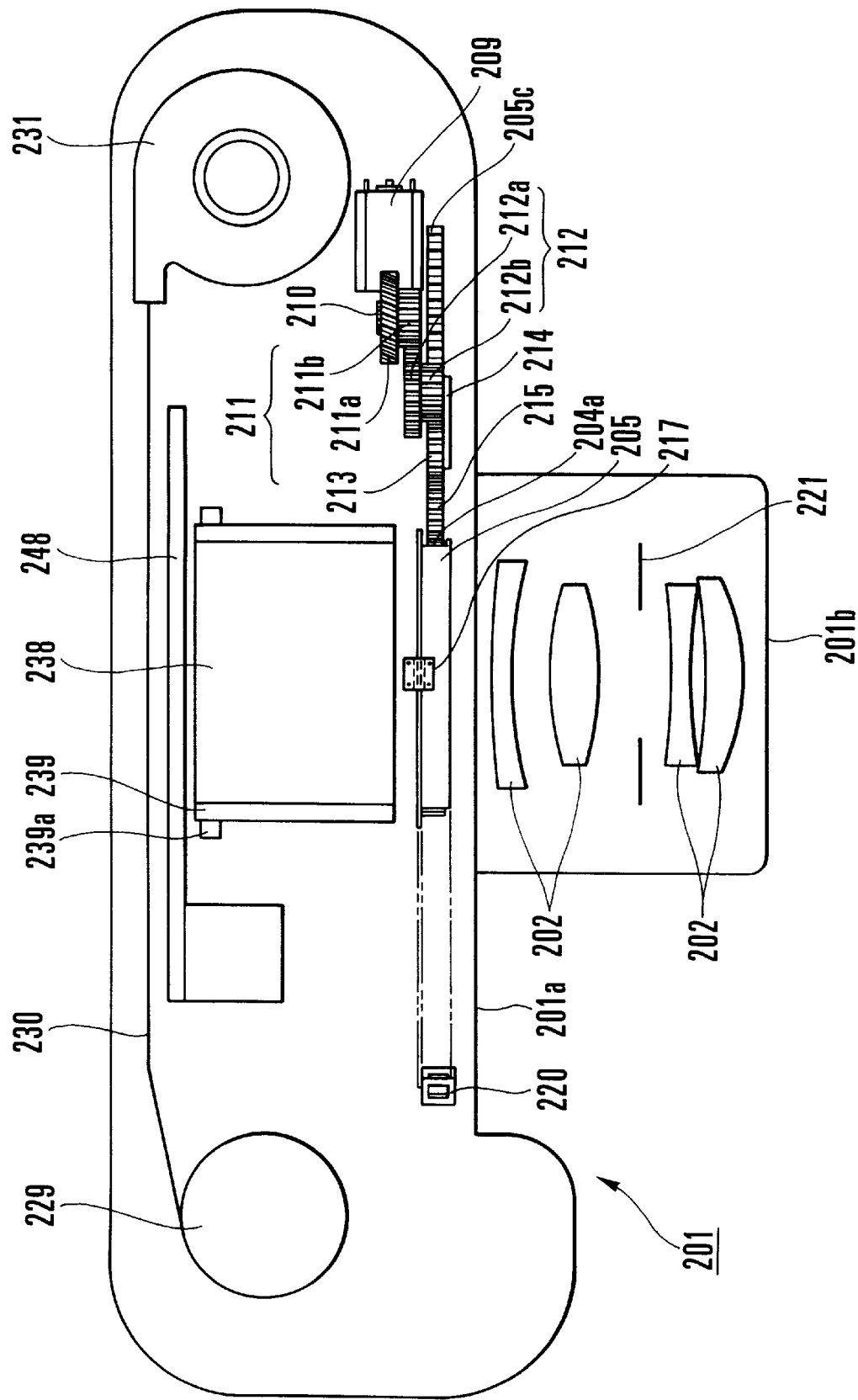
FIG. 8 is a plan view of the essential parts of a single-lens reflex camera according to a second embodiment of the invention.
Figure 9:
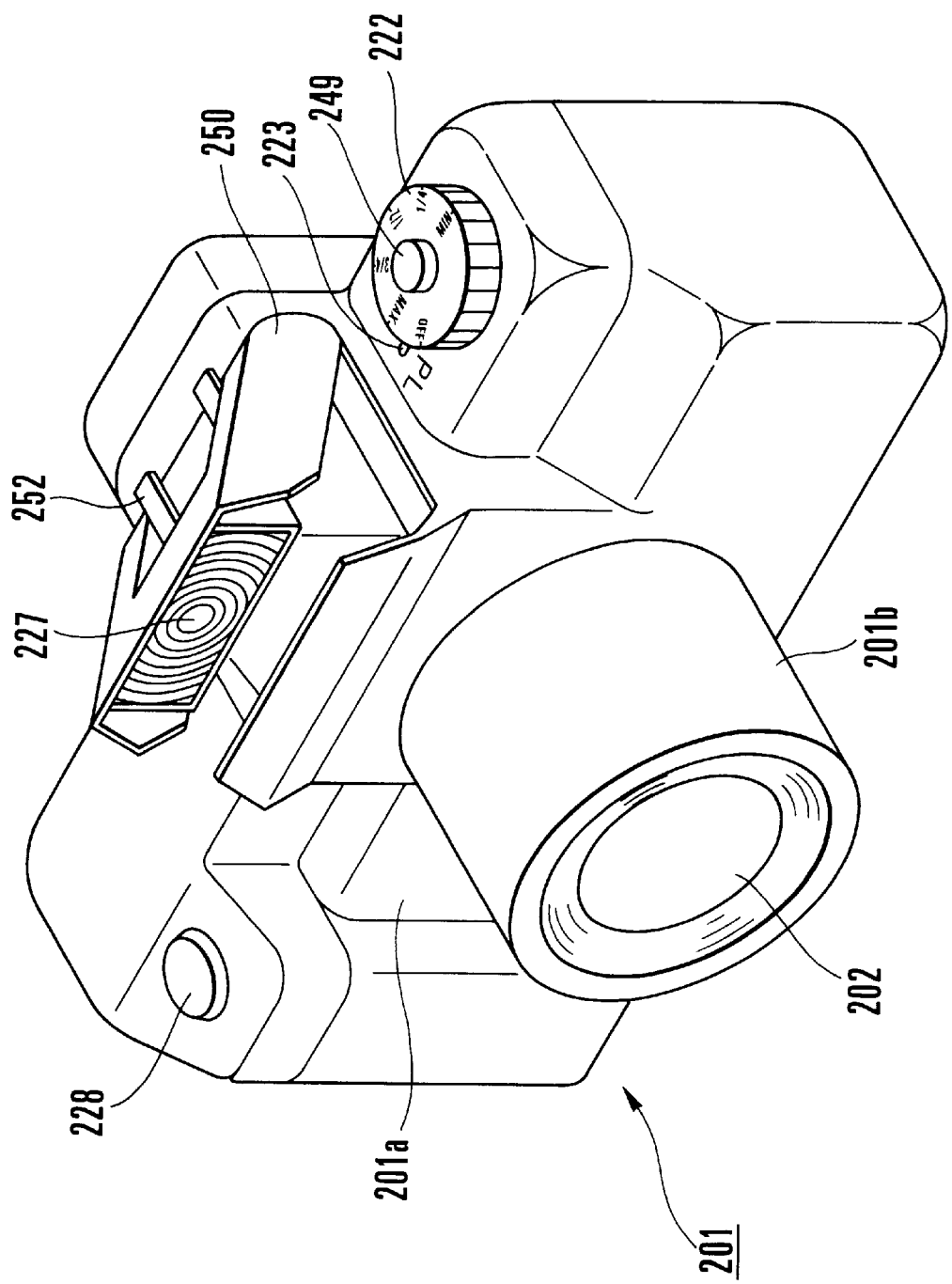
FIG. 9 is a perspective view of the appearance of the single-lens reflex camera shown in FIG. 8.
Figure 10:
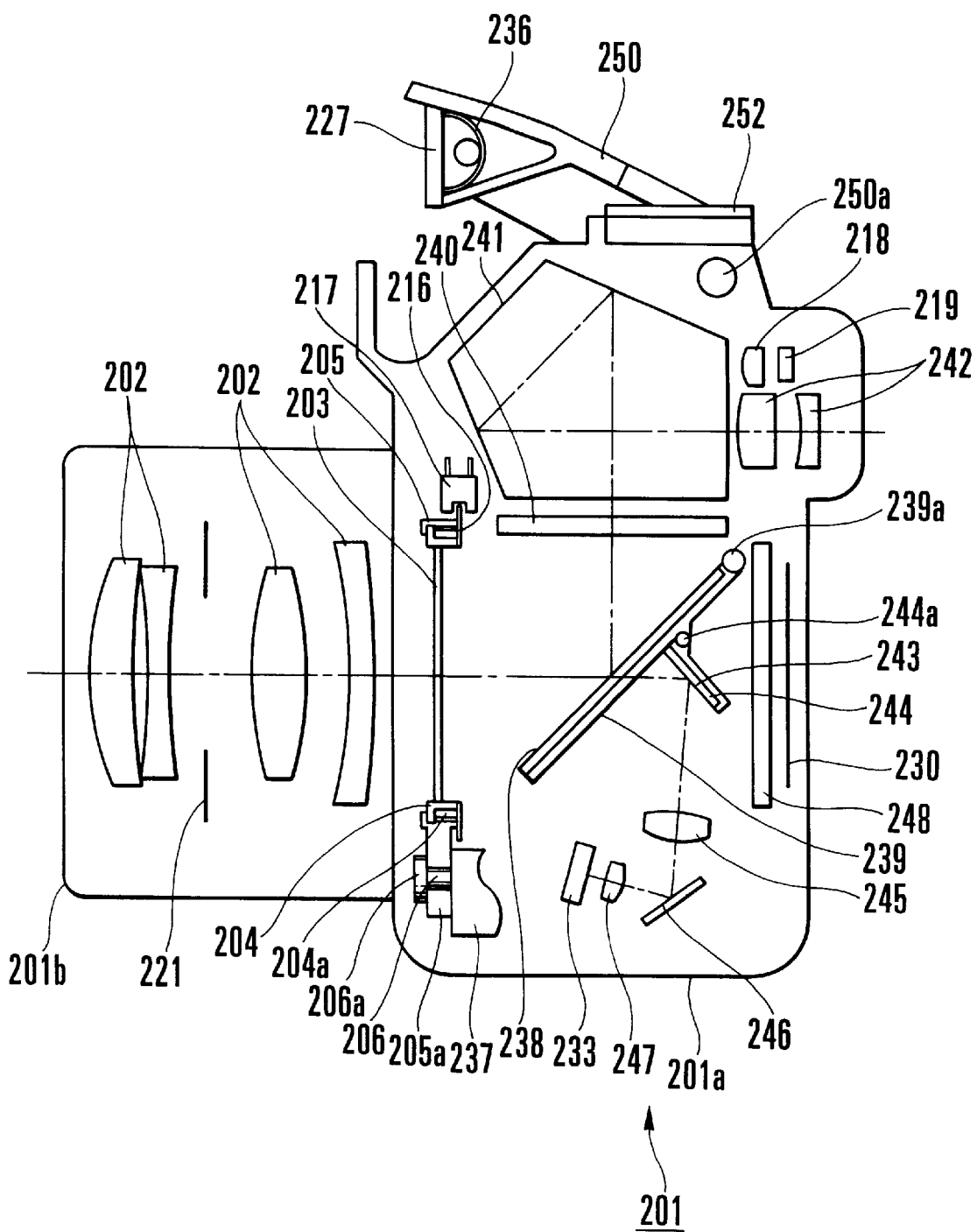
FIG. 10 is a vertical sectional view showing the middle portion of the single-lens reflex camera shown in FIG. 8.
Figure 11:
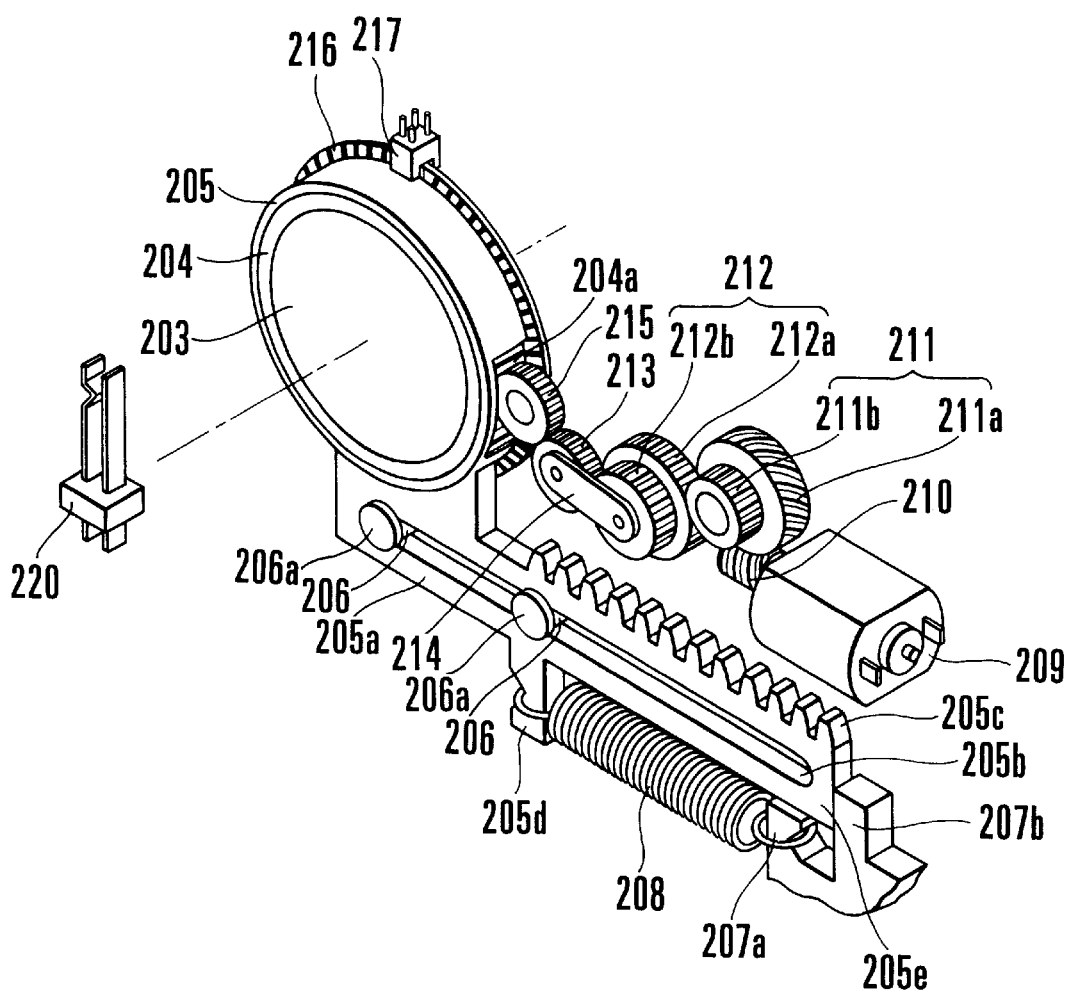
FIG. 11 is a perspective view of a filter driving mechanism of the single-lens reflex camera shown in FIG. 8, showing a state in which a polarizing filter has entered an optical path of a photographic lens.
Figure 12:
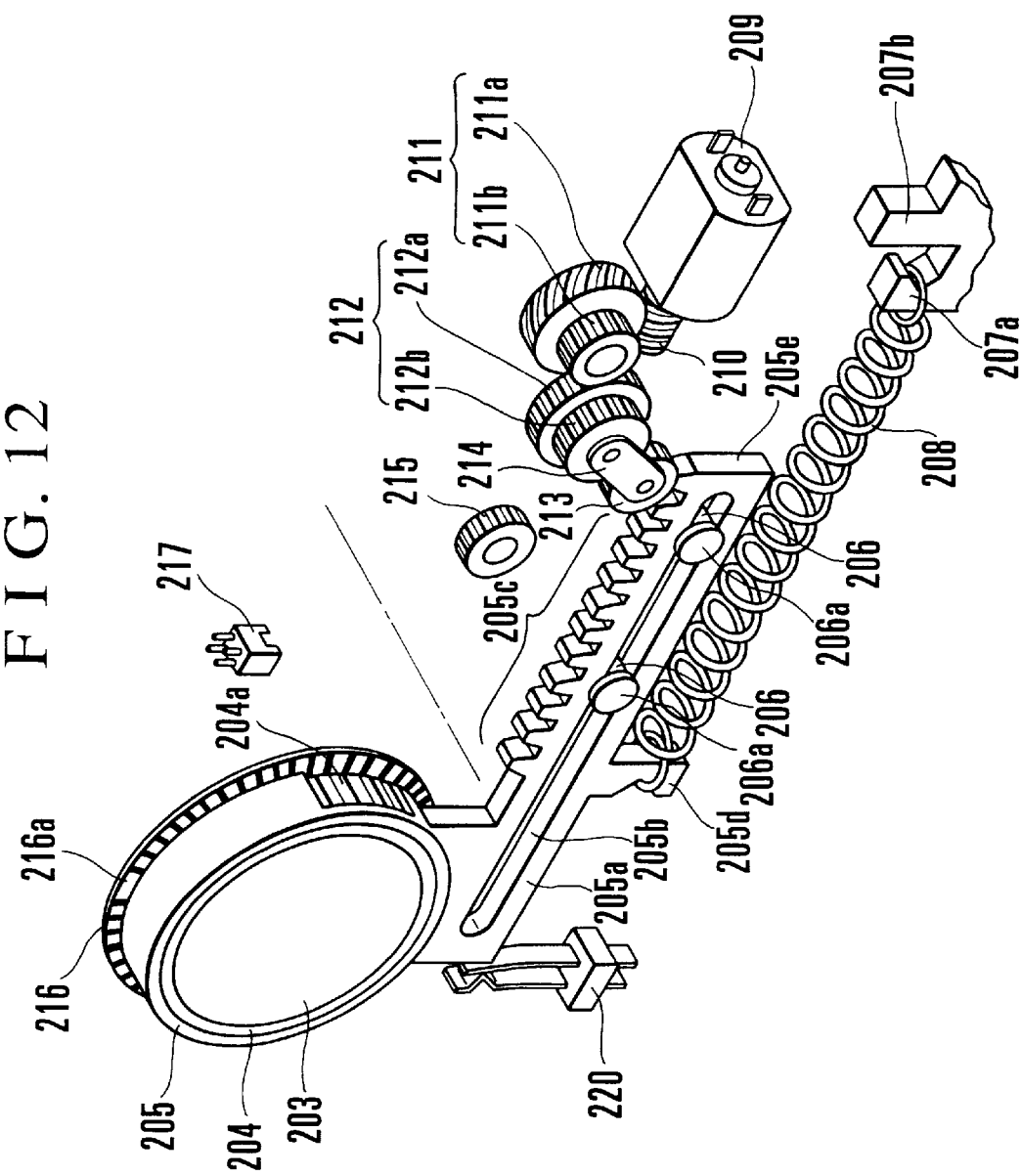
FIG. 12 is a perspective view of the filter driving mechanism of the single-lens reflex camera shown in FIG. 8, showing a state in which the polarizing filter has retreated from the optical path of the photographic lens.
Figure 13:
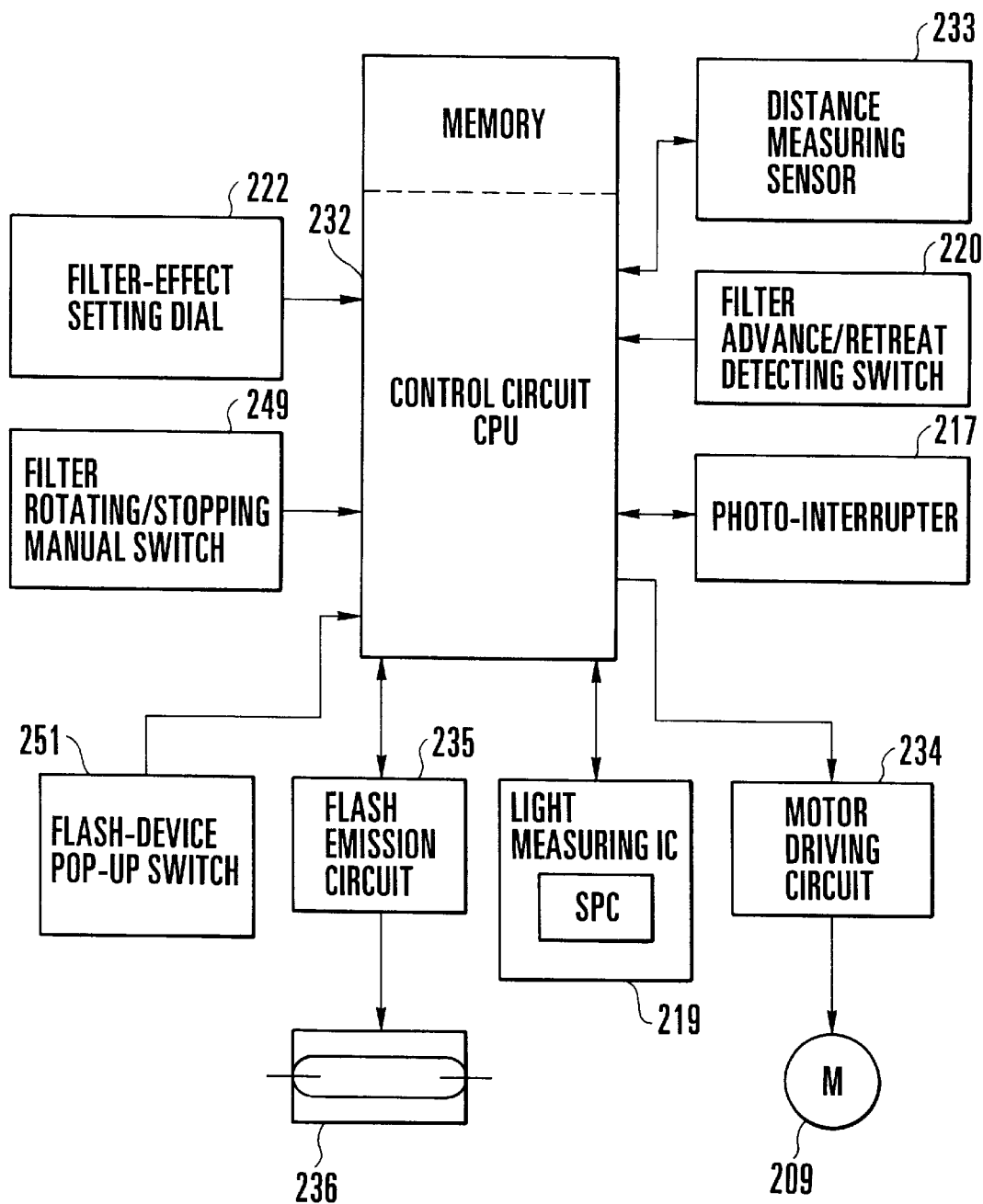
FIG. 13 is a block diagram showing the circuitry of the single-lens reflex camera shown in FIG. 8.
Figure 14:
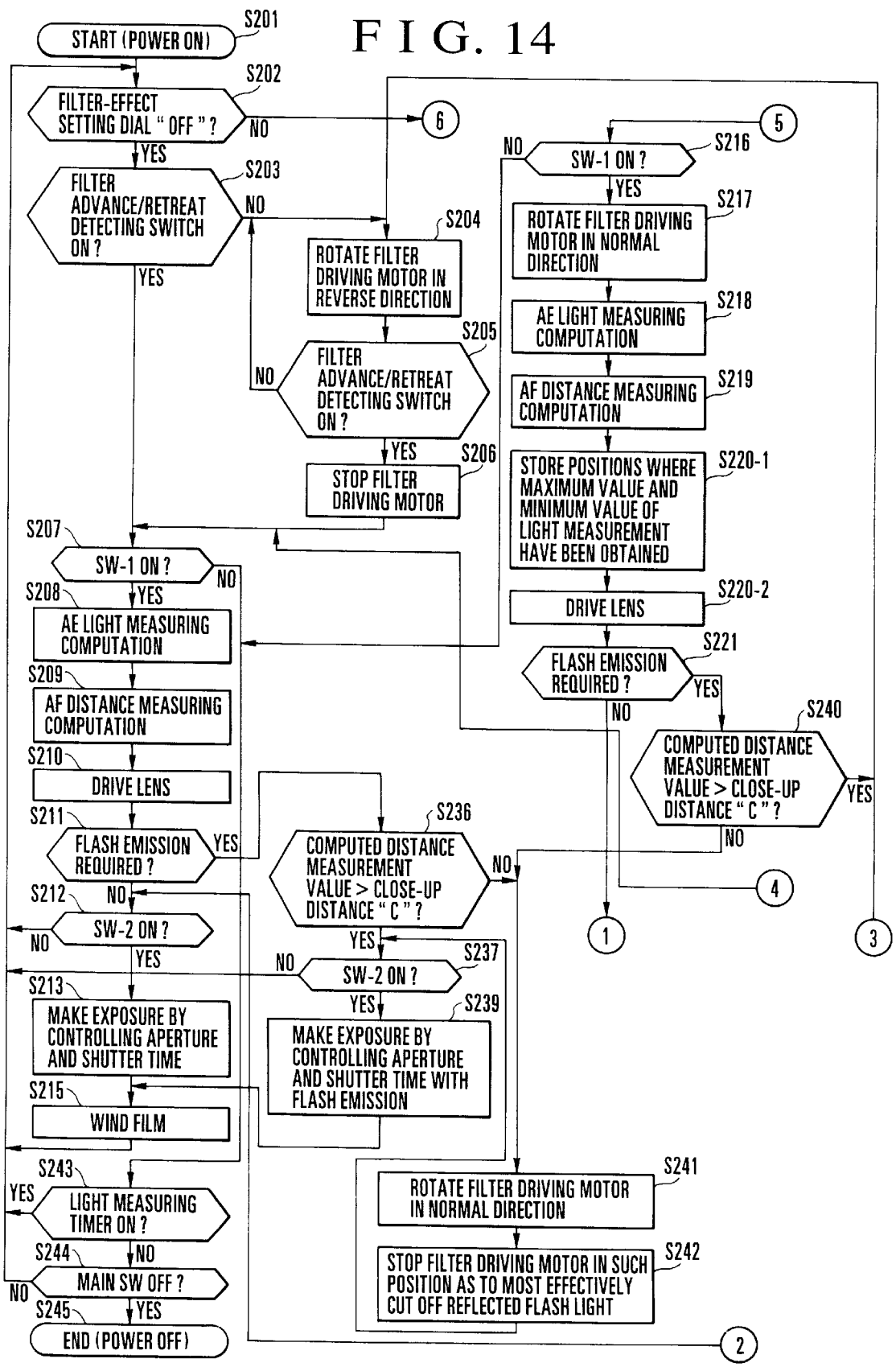
FIG. 14 is a flow chart showing the operation of the single-lens reflex camera shown in FIG. 8.
Figure 15:
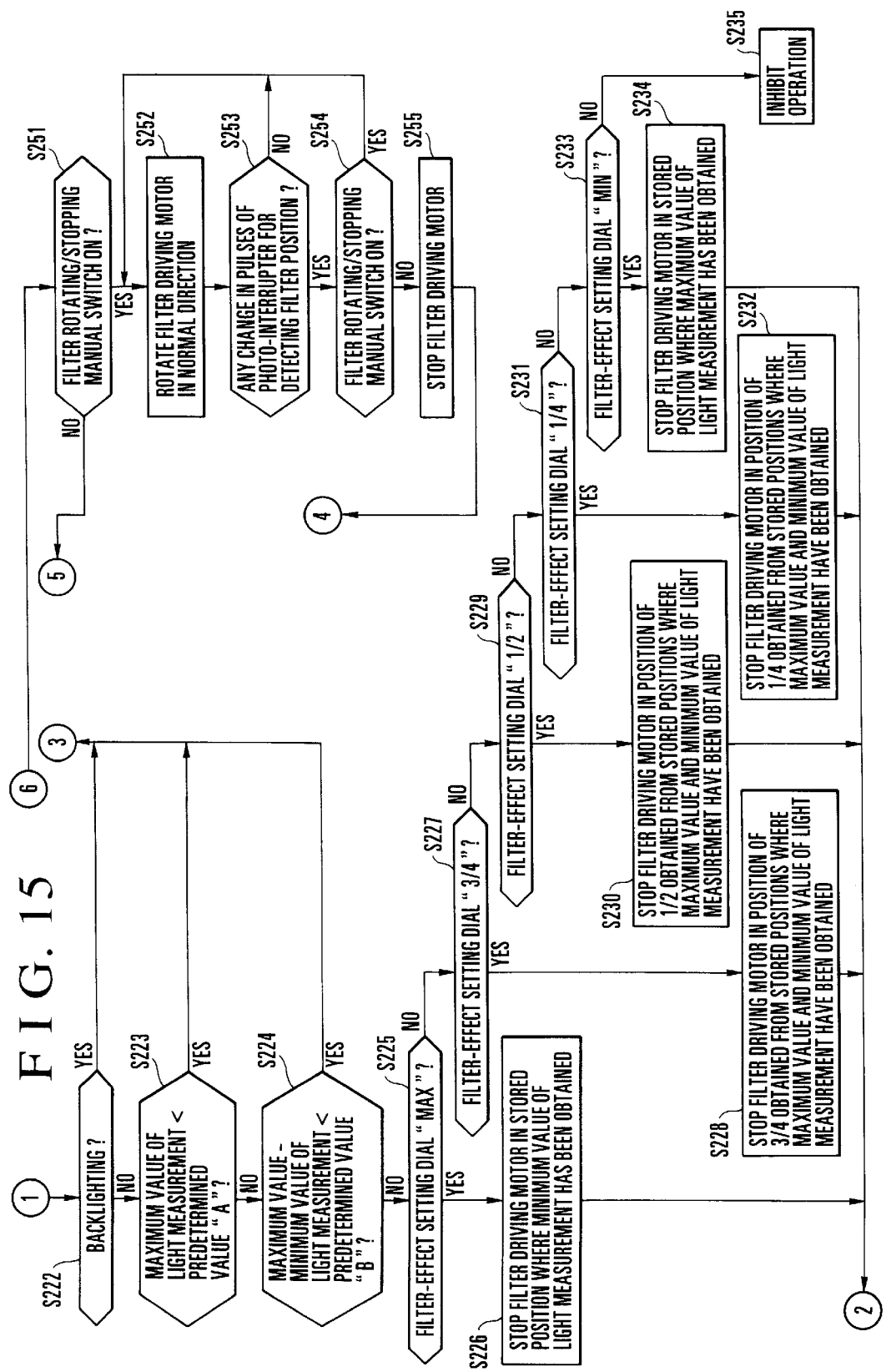
FIG. 15 is a flow chart showing the operation of the single-lens reflex camera shown in FIG. 8.

FIGS. 8 to 15 show a single-lens reflex camera according to a second embodiment of the invention. FIG. 8 is a diagram showing the arrangement of the essential parts of the single-lens reflex camera as viewed from above. FIG. 9 is a perspective view showing the appearance of the single-lens reflex camera. FIG. 10 is a vertical sectional view showing the middle portion of the single-lens reflex camera. FIG. 11 is a perspective view of the essential parts of the single-lens reflex camera in a state in which a filter has entered an optical path of a photographic lens. FIG. 12 is a perspective view of the essential parts of the single-lens reflex camera in a state in which the filter has retreated from the optical path of the photographic lens. FIG. 13 is a block diagram showing constituents of the circuitry of the single-lens reflex camera. FIGS. 14 and 15 are flow charts showing the operation of the single-lens reflex camera.

Referring to FIGS. 8 to 13, reference numeral 201 denotes a single-lens reflex camera, which is composed of a camera body part 201a in which all the essential elements shown in FIGS. 11 and 12 are contained and a lens barrel 201b in which a part of a photographic lens 202 is contained. The photographic lens 202 is usable for close-up photography (macrophotography). Reference numeral 203 denotes a polarizing filter (optical filter).

The polarizing filter 203 is fixedly held by a filter holding frame 204. The filter holding frame 204 is supported, at the front side (object side) on the outer circumference thereof, by a filter supporting member 205 in such a way as to be rotatable around an axis parallel with the optical axis of the photographic lens 202. A gear (hereinafter referred to as the filter gear) 204a for receiving a rotating force is provided at the rear side (film surface side) on the outer circumference of the filter holding frame 204.

Reference numeral 205a shown in FIGS. 10 to 12 denotes an advance/retreat guide part of the filter supporting member 205. In the advance/retreat guide part 205a, there is formed a slot 205b in which two guide pins 206 mounted on a camera body 237 and having the respective flanges 206a are fitted. The filter supporting member 205 is thus supported by the camera body 237 in such a way as to be slidable in a direction perpendicular to the optical axis (toward the right and left sides of the camera) due to the fitting engagement between the guide pins 206 and the slot 205b, and in such a way as to be restricted from moving in the direction of the optical axis because of being sandwiched at a slight interval between the flanges 206a of the guide pins 206 and the camera body 237.

A rack gear 205c is provided at the upper end of the advance/retreat guide part 205a of the filter supporting member 205. A spring hook 205d is provided at the lower end of the advance/retreat guide part 205a of the filter supporting member 205. A spring hook 207a and a stopper 207b are provided at the camera body 237. When the right end 205e of the advance/retreat guide part 205a of the filter supporting member 205 abuts on the stopper 207b, as shown in FIG. 11, the center of rotation of the polarizing filter 203 approximately coincides with the optical axis of the photographic lens 202.

A tension coiled-spring 208 is hooked between the spring hooks 205d and 207a and is arranged to generate tension so as to cause the right end 205e of the advance/retreat guide part 205a and the stopper 207b to abut on each other in the state shown in FIG. 11.

A filter driving electromagnetic motor (hereinafter referred to as the filter driving motor) 209 is fixed to the camera body 237. A first two-stage gear 211 has a large, helical gear 211a, which meshes with a worm gear 210 of the filter driving motor 209, and a small gear 211b. A second two-state gear 212 has a large gear 212a, which meshes with the small gear 211b, and a small gear 212b, which serves as a sun gear meshing with a planet gear 213.

A planetary arm 214 is arranged to hold the planet gear 213 for revolution around the sun gear 212b. An idler gear 215 is arranged to connect the planet gear 213 and the filter gear 204a with each other. The gears 211, 212 and 215 are mounted on the camera body 237 in such a way as to be rotatable. In accordance with the normal rotation or reverse rotation of the filter driving motor 209, the planet gear 213 revolves around the sun gear 212b clockwise or counterclockwise to mesh with the idler gear 215 or the rack gear 205c, so that a driving force for rotating the polarizing filter 203 or for causing the polarizing filter 203 to advance to or retreat from the optical path of the photographic lens 202 is transmitted to the idler gear 215 or the rack gear 205c.

Incidentally, the filter driving motor 209, the gears 210, 211, 212 and 213, the planetary arm 214, the idler gear 215 and the filter gear 204a constitute filter rotating means. The rack gear 205c, the tension coiled-spring 208, the filter driving motor 209, the gears 210, 211, 212 and 213 and the planetary arm 214 constitute filter advance/retreat means.

A phase plate 216 is fixed at the rear end of the filter holding frame 204 (behind the filter gear 204a) coaxially with the axis of rotation of the polarizing filter 203. The phase plate 216 is formed in a ring-like shape so as not to block the optical path of the polarizing filter 203. Further, the phase plate 216 is made of a thin film such as lith film, on which a repetitive pattern composed of light-transmitting parts and light-blocking parts is formed. Incidentally, reference numeral 216a shown in FIG. 12 denotes an initial-position-detecting light-transmitting part, which is formed to have a larger phase than that of the other light-transmitting part.

A photo-interrupter 217 is disposed just above the optical axis of the photographic lens 202 while sandwiching the phase plate 216, and is arranged to output a signal when each of the light-transmitting parts of the phase plate 216 is located inside the photo-interrupter 217 in accordance with the rotation of the polarizing filter 203 and to stop outputting the signal when each of the light-blocking parts of the phase plate 216 is located inside the photo-interrupter 217. Accordingly, a pulse signal equivalent to the rotation angle of the polarizing filter 203 is formed, so that the rotated position of the polarizing filter 203 is detected by counting the number of pulses of the pulse signal from the initial position by means of a control circuit 232 shown in FIG. 13.

A main mirror 238, a portion of which around the photo-taking optical axis is formed into a half-mirror, is fixed by adhesive to a main-mirror receiving plate 239, a portion of which around the photo-taking optical axis is made into an opening. The main mirror 238 is arranged to be rotatable, around a shaft 239a provided on the main-mirror receiving plate 239, between an observing state (as shown in FIG. 10) in which the main mirror 238 has moved down and a retreating state (not shown) in which the main mirror 238 has moved up to retreat from the photo-taking optical path. In the observing state in which the main mirror 238 has moved down, object light having passed through the photographic lens 202 is reflected by the main mirror 238 upward at 45°, and is imaged on a focusing screen 240. The image formed on the focusing screen 240 is converted by a pentagonal roof prism 241 into a non-inverted erecting image, which is observable by the photographer through an eyepiece lens 242.

A light measuring lens 218 and a light measuring sensor (SPC) 219 are disposed behind the exit surface of the pentagonal roof prism 241 and are arranged to measure object field light having passed through the polarizing filter 3. The light measuring sensor 219 has a backlighting detecting function of detecting separately an output of the central portion of the light receiving surface and an output of the peripheral portion thereof, and is formed integrally with a light measuring IC 219 as shown in FIG. 13.

A sub-mirror 243 is fixed by adhesive to a sub-mirror receiving plate 244. The sub-mirror receiving plate 244 is rotatably supported by the main-mirror receiving plate 239 at a shaft 244a. In the observing state in which the main mirror 238 has moved down as shown in FIG. 10, the sub-mirror 243 guides object light having passed through the half-mirror portion around the photo-taking optical axis of the main mirror 238 to a focus detecting part disposed in the lower portion of the camera. On the other hand, in the retreating state (not shown) in which the main mirror 238 has moved up to retreat from the photo-taking optical axis, the sub-mirror receiving plate 244 covers the opening around the photo-taking optical axis of the main-mirror receiving plate 239.

A focus detecting optical system of the focus detecting part includes a field lens 245, a reflecting mirror 246 and a secondary image forming lens 247. A distance measuring sensor 233 of the focus detecting part is of the passive autofocus phase-difference detection type. A focal-plane shutter 248 is disposed behind the main mirror 238.

A filter advance/retreat detecting switch 220 is arranged to turn off when the polarizing filter 203 has entered the optical path of the photographic lens 202 and to turn on when the polarizing filter 203 has retreated from the optical path. A diaphragm 221 is disposed within the photographic lens 202, as shown in FIGS. 8 and 10.

A filter-effect setting dial 222 provided on the top surface of the camera body part 201a as shown in FIG. 9 is rotatable by the photographer to selectively set the effect of the polarizing filter 203.

Specifically, the filter-effect setting dial 222 is settable to a position "OFF" for causing the polarizing filter 203 to retreat from the optical path of the photographic lens 202, a position "MAX" for causing the polarizing filter 203 to enter the optical path of the photographic lens 202 and setting the polarizing filter 203 to such a rotated position as to obtain a maximum filter effect, a position "MIN" for setting the polarizing filter 203 to such a rotated position as to obtain a minimum filter effect, a position "½" for setting the polarizing filter 203 to such a rotated position as to obtain a filter effect which is one-half of the range between the maximum filter effect and the minimum filter effect, a position "¼" for setting the polarizing filter 203 to such a rotated position as to obtain a filter effect which is one fourth of the range between the maximum filter effect and the minimum filter effect, and a position "¾" for setting the polarizing filter 203 to such a rotated position as to obtain a filter effect which is three fourths of the range between the maximum filter effect and the minimum filter effect.

An index 223 which is used for selecting one of the above positions is provided adjacent to the filter-effect setting dial 222. On the central portion of the filter-effect setting dial 222, there is provided a filter rotating/stopping manual switch 249. When the filter rotating/stopping manual switch 249 is depressed with the finger of the photographer as in the release button, the filter rotating/stopping manual switch 249 is turned on to cause the filter driving motor 209 to rotate in the normal direction, so that the polarizing filter 203 is rotated. Further, when the filter rotating/stopping manual switch 249 is released from the finger of the photographer, the filter rotating/stopping manual switch 249 is turned off to stop the filter driving motor 209, so that the polarizing filter 203 is stopped from rotating. Thus, it is possible for the photographer to set the polarizing filter 203 to a desired arbitrary rotated position while viewing the viewfinder and recognizing the filter effect.

In FIG. 9, there are further illustrated a flash emitting window 227 and a release button 228. In FIG. 8, there are further illustrated a film take-up spool 229, a film 230 and a film cartridge 231.

Referring to FIG. 13, the control circuit (CPU) 232 controls the whole of the camera and has the computing function of performing various computing operations on the basis of light measurement values obtained by the light measuring sensor 219 while rotating the polarizing filter 203, the memorizing function of storing the specific rotated positions of the polarizing filter 203, etc. Further, the control circuit 232 performs also both the distance measuring computation and the focus adjusting control to cause a lens driving motor (not shown) to move a focus adjusting lens element for focus adjustment.

The AF control system, the AF driving system, the sub-mirror 243 and the focus detecting part composed of the field lens 245, the reflecting mirror 246 and the secondary image forming lens 247 of the focus detecting optical system and the distance measuring sensor 233 of the passive autofocus phase-difference detection type constitute a focus adjusting device.

A motor driving circuit 234 is arranged to drive the filter driving motor 209. A flash emission circuit 235 is arranged to generate a high voltage for causing a flash device to emit flash light. A flash emitting part 236 is composed of a light emitting tube and a reflector.

A retractable flash-device support cover 250 is supported for rotation around a shaft 250a and is arranged to be shiftable between a stowage position and a light emitting position by a retraction mechanism (not shown). A flash-device pop-up switch 251 is arranged to be turned on when the flash device has been made to pop up to the light emitting position by the retraction mechanism and to be turned off when the flash device has been stowed in the stowage position. In FIGS. 9 and 10, reference numeral 252 denotes an accessory shoe.

Next, the control operation of the control circuit 232 will be described with reference to the flow charts of FIGS. 14 and 15. It is to be noted that, in the flow charts of FIGS. 14 and 15, portions having the same encircled numerals are connected with each other.

In step S201, when a main switch (not shown) is turned on, electric power is supplied to the camera, so that the camera is brought into a ready-for-photo-taking initial state.

In step S202, the control circuit 232 detects the setting state of the filter-effect setting dial 222. If the setting state of the filter-effect setting dial 222 indicates the position "OFF", the flow proceeds to step S203. If the setting state of the filter-effect setting dial 222 indicates any one of the positions "MAX", "3/4", "1/2", "1/4" and "MIN", the flow proceeds to step S251.

In step S203, the control circuit 232 detects the state of the filter advance/retreat detecting switch 220 to make a check to find if the polarizing filter 203 has surely retreated from the optical path of the photographic lens 202 (i.e., in the state shown in FIG. 12). If the switch 220 is found to be turned on, the flow proceeds to step S207 with determination that the polarizing filter 203 has retreated. If the switch 220 is found to be turned off, the flow proceeds to step S204 with determination that the polarizing filter 203 has still entered the optical path of the photographic lens 202 (i.e., in the state shown in FIG. 11).

In step S204, the motor control circuit 232 sends a command to the motor driving circuit 234 to cause the filter driving motor 209 to rotate in the reverse direction. The reverse rotating force of the filter driving motor 209 is transmitted to the first two-stage gear 211 through the worm gear 210. Then, from the state shown in FIG. 11, the first two-stage gear 211 rotates clockwise, the second two-stage gear 212 rotates counterclockwise, and the planet gear 213 revolves counterclockwise around the sun gear 212b. Accordingly, the planet gear 213, which has meshed with the idler gear 215 until now, is made to mesh with the rack gear 205c, and then continues rotating until the filter supporting member 205 is moved against the tension of the tension coiled-spring 208 to such a position that the polarizing filter 203 has completely retreated from the optical path of the photographic lens 202 (the state shown in FIG. 12).

In step S205, the control circuit 232 again detects the state of the filter advance/retreat detecting switch 220 to make a check to find if the polarizing filter 203 has surely retreated from the optical path of the photographic lens 202 (i.e., in the state shown in FIG. 12). If the switch 220 is found to be turned on, the flow proceeds to step S206 with determination that the polarizing filter 203 has retreated. If the switch 220 is found to be turned off, the process of step S204 is repeated with determination that the polarizing filter 203 has not yet retreated from the optical path of the photographic lens 202.

In step S206, the control circuit 232 sends a command to the motor driving circuit 234 to stop the filter driving motor 209, so that the filter driving motor 209 is brought to a stop. In this instance, such tension as to cause the polarizing filter 203 to advance to the optical path of the photographic lens 202 is made to act on the filter supporting member 205 by the tension coiled-spring 208. However, since the meshing engagement from the rack gear 205c to the worm gear 210 through the planet gear 213, the second two-stage gear 212 and the first two-stage gear 211 in this order is arranged in the speed increasing direction and the final stage of the speed increasing arrangement is the worm gear 210, there is no possibility that the filter driving motor 209 is reversely rotated by the tension of the spring 208. Therefore, the filter supporting member 205 is held in position in the state shown in FIG. 12.

Incidentally, if a case where large shock happens to be applied to the camera to break the meshing engagement of the above gears is into consideration, such a lock mechanism as to lock and hold the advance/retreat guide part 205a of the filter supporting member 205 in the state shown in FIG. 12 and to unlock the advance/retreat guide part 205a in response to the normal rotation of the filter driving motor 209 may be provided. Subsequently, the flow proceeds to step S207.

In step S207, the control circuit 232 makes a check to find if a switch SW-1 is turned on with the release button 228 pushed up to the first stroke thereof. If so, the flow proceeds to step S208. If not, the flow jumps to step S243.

In step S208, the control circuit 232 takes in a light measurement output of the light measuring sensor 219 formed integrally with the light measuring IC, and performs an AE light measuring computation to decide an exposure control value.

In step S209, the control circuit 232 performs an AF distance measuring computation on the basis of an output of the distance measuring sensor 233 and decides the amount of driving of the photographic lens 202 for focus adjustment.

In step S210, the control circuit 232 drives the photographic lens 202 on the basis of the amount of driving of the photographic lens 202 decided in step S209, thereby performing focus adjustment.

In step S211, in a case where a flash-emission auto-setting mode is selected by a flash mode setting means (not shown) and the luminance of the object is found by the AE light measuring computation in step S208 to be so low as to require the flash emission, or in a case where a flash-emission forcing mode is selected by the flash mode setting means, the control circuit 232 determines to perform the flash emission and makes preparation for the flash emission by causing a pop-up mechanism (not shown) to pop up the flash device. Then, the flow proceeds to step S236. If the control circuit 232 determines not to perform the flash emission, the flow proceeds to step S212.

In step S212, the control circuit 232 makes a check to find if a switch SW-2 is turned on with the release button 28 pushed up to the second stroke thereof. If so, the flow proceeds to step S213. If not, the flow returns to step S202.

In step S213, the control circuit 232 controls the aperture diameter of the diaphragm 221 and the shutter time of the focal-plane shutter 248 on the basis of the exposure control value decided in step S208, thereby performing exposure.

In step S215, the control circuit 232 causes the film 230 to be wound for one frame portion thereof so as to make preparation for the next photo-taking operation. After completion of the winding of the film 230, the flow returns to step S202.

In step S251, the control circuit 232 makes a check to find if the filter rotating/stopping manual switch 249 is depressed to turn on. If so, the flow proceeds to step S252. If not, the flow proceeds to step S216.

In step S252, the motor control circuit 232 sends to the motor control circuit 234 a command to cause the filter driving motor 209 to rotate in the normal direction. The normal rotating force of the filter driving motor 209 is transmitted to the first two-stage gear 211 through the worm gear 210. Then, in a case where the beginning is the state shown in FIG. 12, the first two-stage gear 211 rotates counterclockwise, the second two-stage gear 212 rotates clockwise, and the planet gear 213 revolves clockwise around the sun gear 212b.

Accordingly, the planet gear 213, which has meshed with the rack gear 205c, disengages from the rack gear 205c and, then, meshes with the idler gear 215. At the same time, the filter supporting member 205, which is pulled by the tension coiled-spring 208, moves up to a position where the right end 205e of the advance/retreat guide part 205a abuts on the stopper 207b. Accordingly, the polarizing filter 203 enters the predetermined position inside the optical path of the photographic lens 202, and the filter gear 204a is made to mesh with the idler gear 215, so that the state shown in FIG. 11 is realized. Incidentally, in a case where the beginning is the state shown in FIG. 11, the above operation beginning from the state shown in FIG. 12 does not occur.

Even after that, the filter driving motor 209 is made to continue rotating in the normal direction to cause the filter gear 204a to rotate counterclockwise. In accordance with the rotation of the filter gear 204a, the polarizing filter 203, which is held by the filter holding frame 204 formed integrally with the filter gear 204a, rotates counterclockwise around an axis which approximately coincides with the optical axis of the photographic lens 202.

In step S253, the control circuit 232 detects an output signal of the photo-interrupter 217 to find if there is any change in pulses in the output signal. If so, the control circuit 232 determines that the polarizing filter 203 is rotating. Then, the flow proceeds to step S254. If not, the control circuit 232 determines that the polarizing filter 203 has not yet been set to the predetermined position inside the optical path of the photographic lens 202 and is, therefore, not rotating. Then, the flow returns to step S252.

In step S254, the control circuit 232 makes a check to find if the filter rotating/stopping manual switch 249 is still depressed to turn on. If so, the flow returns to step S252. If not, the flow proceeds to step S255.

In step S255, the control circuit 232 sends a command to the motor driving circuit 234 to stop the filter driving motor 209, so that the filter driving motor 209 is brought to a stop. Subsequently, the flow proceeds to step S207.

In step S216, after it is found that the filter-effect setting dial 222 is set to any position other than the position "OFF", the control circuit 232 makes a check to find if the switch SW-1 has been turned on with the release button 228 pushed to the first stroke thereof. If so, the flow proceeds to step S217. If not, the flow jumps to step S243.

In step S217, the motor control circuit 232 sends to the motor control circuit 234 a command to cause the filter driving motor 209 to rotate in the normal direction. The normal rotating force of the filter driving motor 209 is transmitted to the first two-stage gear 211 through the worm gear 210. Then, in a case where the beginning is the state shown in FIG. 12, the first two-stage gear 211 rotates counterclockwise, the second two-stage gear 212 rotates clockwise, and the planet gear 213 revolves clockwise around the sun gear 212b.

Accordingly, the planet gear 213, which has meshed with the rack gear 205c, disengages from the rack gear 205c and, then, meshes with the idler gear 215. At the same time, the filter supporting member 205, which is pulled by the tension coiled-spring 208, moves up to a position where the right end 205e of the advance/retreat guide part 205a abuts on the stopper 207b. Accordingly, the polarizing filter 203 enters the predetermined position inside the optical path of the photographic lens 202, and the filter gear 204a is made to mesh with the idler gear 215, so that the state shown in FIG. 11 is realized. Incidentally, in a case where the beginning is the state shown in FIG. 11, the above operation beginning from the state shown in FIG. 12 does not occur.

Even after that, the filter driving motor 209 is made to continue rotating in the normal direction to cause the filter gear 204a to rotate counterclockwise. In accordance with the rotation of the filter gear 204a, the polarizing filter 203, which is held by the filter holding frame 204 formed integrally with the filter gear 204a, rotates counterclockwise around an axis which approximately coincides with the optical axis of the photographic lens 202.

In step S218, the control circuit 232, while rotating the polarizing filter 203, takes in a light measurement output of the light measuring sensor 219, which has received object light having passed through the polarizing filter 203, and performs the AE light measuring computation.

In step S219, at the same time with step S218, the control circuit 232 performs the AF distance measuring computation on the basis of the output of the distance measuring sensor 233 to decide the amount of driving of the photographic lens 202 for focus adjustment. The output of the distance measuring sensor 233 obtained in this instance is based on the object light having passed through the photographic lens 202 and the polarizing filter 203 and is, therefore, clearly different from the distance measurement result obtained without inserting the polarizing filter 203, to the extent that the optical path length is increased by inserting the polarizing filter 203. However, since, in the TTL single-lens reflex camera, a change of the optical path length caused by inserting the polarizing filter 203 is the same in respect of light to the film 230 and light to the distance measuring sensor 233, the output of the distance measuring sensor 233 is used, as it is, for the same distance measuring computation without being corrected, to obtain the amount of driving of the photographic lens 202 for focus adjustment.

In step S220-1, at the same time with steps S218 and S219, the control circuit 232 detects and computes a maximum value and a minimum value from among light measurement outputs of the light measuring sensor 219, correlates each light measurement output with the count number of pulses obtained by the photo-interrupter 217 from the initial position, and stores the respective rotated positions of the polarizing filter 203 obtained when the light measurement output has indicated the maximum value and the minimum value.

In step S220-2, the control circuit 232 drives the photographic lens 202 on the basis of the amount of driving of the photographic lens 202 decided in step S219, thereby performing focus adjustment.

In step S221, in a case where the flash-emission forcing mode is selected by the flash mode setting means, the control circuit 232 determines to perform the flash emission and makes preparation for the flash emission by causing the pop-up mechanism (not shown) to pop up the flash device. Then, the flow proceeds to step S240. If the control circuit 232 determines not to perform the flash emission, the flow proceeds to step S222.

In step S222, in a case where, in the AE light measuring computation in step S218, the difference between light measurement outputs of the central portion and the peripheral portion of the light receiving surface of the light measuring sensor 219 is grater than a predetermined value, the control circuit 232 determines that the current photo-taking operation is made for the backlighting photography, which receives little effect from the polarizing filter 203. Then, the flow returns to step S204 to cause the polarizing filter 203 to retreat from the optical path of the photographic lens 202. If it is determined that the current photo-taking operation is not made for the backlighting photography, the flow proceeds to step S223.

In step S223, the control circuit 232 makes a check to find if the maximum value of the light measurement outputs obtained in the AE light measuring computation in step S218 with the polarizing filter 203 inserted is less than a predetermined value "A". If so, the control circuit 232 determines that the current photo-taking operation is made for the low-luminance object photography and the flash emission is required because the photo-taking operation without the flash emission makes the shutter exposure time too long, causing the possibility of camera-shake. Then, the flow returns to step S204 to cause the polarizing filter 203 to retreat from the optical path of the photographic lens 202. If it is found that the maximum value is not less than the predetermined value "A", the flow proceeds to step S224.

In step S224, the control circuit 232 makes a check to find if the difference between the maximum value and the minimum value of the light measurement outputs obtained in the AE light measuring computation in step S218 with the polarizing filter 203 inserted is less than a predetermined value "B". If so, the control circuit 232 determines that the effect of the polarizing filter 203 is little. Then, the flow returns to step S204 to cause the polarizing filter 203 to retreat from the optical path of the photographic lens 202. If it is found that the difference is not less than the predetermined value "B", the flow proceeds to step S225.

In step S225, the control circuit 232 detects the setting state of the filter-effect setting dial 222 to find if the filter-effect setting dial 222 is set to the position "MAX". If so, the flow proceeds to step S226. If not, the flow proceeds to step S227.

In step S226, the control circuit 232 sends a control signal to the motor driving circuit 234 so as to set the polarizing filter 203 to the position stored in step S220-1 where the light measurement output has indicated the minimum value, i.e., where the effect of the polarizing filter 203 is greatest. Then, the control circuit 232 counts pulses outputted from the photo-interrupter 217 from the initial position, and stops driving the filter driving motor 209 at a point of time where the desired rotated position of the polarizing filter 203 has been obtained. After that, the flow proceeds to step S212.

In step S227, the control circuit 232 detects the setting state of the filter-effect setting dial 222 to find if the filter-effect setting dial 222 is set to the position "¾". If so, the flow proceeds to step S228. If not, the flow proceeds to step S229.

In step S228, the control circuit 232 divides into four equal parts the rotation angle of the polarizing filter 203 between the position stored in step S220-1 where the light measurement output has indicated the minimum value and the position stored in step S220-1 where the light measurement output has indicated the maximum value, and sends a control signal to the motor driving circuit 234 so as to set the polarizing filter 203 to the position where the effect of the polarizing filter 203 is second greatest, i.e., the position near to the minimum value among the four equal parts (the effect of the polarizing filter 203 corresponds to three fourths of the range from the maximum value to the minimum value). Then, the control circuit 232 counts pulses outputted from the photo-interrupter 217 from the initial position, and stops driving the filter driving motor 209 at a point of time where the desired rotated position of the polarizing filter 203 has been obtained. After that, the flow proceeds to step S212.

In step S229, the control circuit 232 detects the setting state of the filter-effect setting dial 222 to find if the filter-effect setting dial 222 is set to the position "½". If so, the flow proceeds to step S230. If not, the flow proceeds to step S231.

In step S230, the control circuit 232 divides into four equal parts the rotation angle of the polarizing filter 203 between the position stored in step S220-1 where the light measurement output has indicated the minimum value and the position stored in step S220-1 where the light measurement output has indicated the maximum value, and sends a control signal to the motor driving circuit 234 so as to set the polarizing filter 203 to the position where the effect of the polarizing filter 203 is medium, i.e., the middle position among the four equal parts (the effect of the polarizing filter 203 corresponds to one half of the range from the maximum value to the minimum value). Then, the control circuit 232 counts pulses outputted from the photo-interrupter 217 from the initial position, and stops driving the filter driving motor 209 at a point of time where the desired rotated position of the polarizing filter 203 has been obtained. After that, the flow proceeds to step S212.

In step S231, the control circuit 232 detects the setting state of the filter-effect setting dial 222 to find if the filter-effect setting dial 222 is set to the position "¼". If so, the flow proceeds to step S232. If not, the flow proceeds to step S233.

In step S232, the control circuit 232 divides into four equal parts the rotation angle of the polarizing filter 203 between the position stored in step S220-1 where the light measurement output has indicated the minimum value and the position stored in step S220-1 where the light measurement output has indicated the maximum value, and sends a control signal to the motor driving circuit 234 so as to set the polarizing filter 203 to the position where the effect of the polarizing filter 203 is second least, i.e., the position near to the maximum value among the four equal parts (the effect of the polarizing filter 203 corresponds to one fourth of the range from the maximum value to the minimum value). Then, the control circuit 232 counts pulses outputted from the photo-interrupter 217 from the initial position, and stops driving the filter driving motor 209 at a point of time where the desired rotated position of the polarizing filter 203 has been obtained. After that, the flow proceeds to step S212.

In step S233, the control circuit 232 detects the setting state of the filter-effect setting dial 222 to find if the filter-effect setting dial 222 is set to the position "MIN". If so, the flow proceeds to step S234. If not, the flow proceeds to step S235.

In step S234, the control circuit 232 sends a control signal to the motor driving circuit 234 so as to set the polarizing filter 203 to the position stored in step S220-1 where the light measurement output has indicated the maximum value, i.e., where the effect of the polarizing filter 203 is least. Then, the control circuit 232 counts pulses outputted from the photo-interrupter 217 from the initial position, and stops driving the filter driving motor 209 at a point of time where the desired rotated position of the polarizing filter 203 has been obtained. After that, the flow proceeds to step S212.

In step S235, in a case where any of the above dial positions has not been able to be detected in steps S225, S227, S229, S231 and S233, the control circuit 232 determines that a trouble such as failure in contact has occurred in the filter-effect setting dial 222, and sends a control signal to the motor driving circuit 234 to return the polarizing filter 203 to the initial position, which was taken before the rotation thereof, while detecting pulses outputted from the photo-interrupter 217. After that, the control circuit 232 inhibits the operation of the camera.

In step S236, after determining that the flash emission is required in step S211, the control circuit 232 makes a check to find if a distance measurement value obtained in the AF distance measuring computation in step S209 is greater than a predetermined close-up distance "C" which is set for the macrophotography area. If so, the control circuit 232 regards the current photo-taking operation as a normal distance photography, so that the flow proceeds to step S237. If not, the control circuit 232 regards the current photo-taking operation as a close-up distance photography (macrophotography), so that the flow proceeds to step S241.

In step S237, the control circuit 232 makes a check to find if the switch SW-2 is turned on with the release button 228 pushed up to the second stroke thereof. If so, the flow proceeds to step S239. If not, the flow returns to step S202.

In step S239, the control circuit 232 controls the aperture and shutter time of the lens shutter 221 and causes the flash device to emit light so as to make an exposure, on the basis of the exposure control value decided in step S208 if the flow has come through step S208 or on the basis of the exposure control value decided in step S218 if the flow has come through step S218. After that, the flow proceeds to step S215.

In step S240, after determining that the flash emission is required in step S221, the control circuit 232 makes a check to find if a distance measurement value obtained in the AF distance measuring computation in step S219 is greater than the predetermined close-up distance "C" which is set for the macrophotography area. If so, the control circuit 232 regards the current photo-taking operation as a normal distance photography, so that the flow returns to step S204 to cause the polarizing filter 203 to retreat from the optical path of the photographic lens 202. If not, the control circuit 232 regards the current photo-taking operation as a close-up distance photography (macrophotography), so that the flow returns to step S241.

In step S241, the motor control circuit 232 sends to the motor control circuit 234 a command to cause the filter driving motor 209 to rotate in the normal direction. The normal rotating force of the filter driving motor 209 is transmitted to the first two-stage gear 211 through the worm gear 210. Then, in a case where the beginning is the state shown in FIG. 12 while the flow has come through step S236, the first two-stage gear 211 rotates counterclockwise, the second two-stage gear 212 rotates clockwise, and the planet gear 213 revolves clockwise around the sun gear 212b. Accordingly, the planet gear 213, which has meshed with the rack gear 205c, disengages from the rack gear 205c and, then, meshes with the idler gear 215.

At the same time, the filter supporting member 205, which is pulled by the tension coiled-spring 208, moves up to a position where the right end 205e of the advance/retreat guide part 205a abuts on the stopper 207b. Accordingly, the polarizing filter 203 enters the predetermined position inside the optical path of the photographic lens 202, and the filter gear 204a is made to mesh with the idler gear 215, so that the state shown in FIG. 11 is realized. Incidentally, in a case where the beginning is the state shown in FIG. 11 while the flow has come through step S240, the above operation beginning from the state shown in FIG. 12 does not occur.

Even after that, the filter driving motor 209 is made to continue rotating in the normal direction to cause the filter gear 204a to rotate counterclockwise. In accordance with the rotation of the filter gear 204a, the polarizing filter 203, which is held by the filter holding frame 204 formed integrally with the filter gear 204a, rotates counterclockwise around an axis which approximately coincides with the optical axis of the photographic lens 202.

In step S242, the control circuit 232 sends a control signal to the motor driving circuit 234 to set the polarizing filter 203 to such a rotated position as to most effectively prevent the light emitted from the flash device from entering the photographic lens 202 after being reflected from a close object (mainly, a plane-surface object such as copy, particularly, having a smooth surface). Incidentally, the above rotated position is decided almost by the positional relationship between the object and the flash device incorporated in the camera and is beforehand stored in a memory incorporated in the camera.

Then, the control circuit 232 counts pulses outputted from the photo-interrupter 217 from the initial position, and stops driving the filter driving motor 209 at a point of time where the desired rotated position of the polarizing filter 203 has been obtained. After that, the flow proceeds to step S237.

In step S243, the control circuit 232 detects the state of a distance measuring timer, which is provided for maintaining, for a predetermined period of time, a state in which the light measurement is possible, to enable the photographer to change the setting of exposure without depressing the release button to hold the switch SW-1 on. If it is found that the distance measuring timer is operating, the flow returns to step S202. If it is found that, as the predetermined period of time has elapsed, the distance measuring timer is not operating, the flow proceeds to step S244.

In step S244, the control circuit 232 detects the state of the main switch (not shown). If the main switch is detected to be turned on, the flow returns to step S202 to repeat the above operation. If the main switch is detected to be turned off, the flow proceeds to step S245.

In step S245, the control circuit 232 causes the photographic lens barrel to move backward, shuts off the power supply of the camera and brings the flow to an end.

As has been described above, according to the second embodiment, since the polarizing filter 203, the filter rotating means and the filter advance/retreat means are contained in the camera body part 201a, it is possible to dispense with a filter rotating operation or filter mounting/demounting operation by a manual operation, which is troublesome. In addition, since the polarizing filter 203, the filter rotating means and the filter advance/retreat means are disposed in the camera body part 201a in which a space can be easily secured in a direction perpendicular to the optical axis of the photographic lens 202, it is possible to prevent the increase in cost of the camera system or the failure of an external design of the camera.

Further, according to the second embodiment, the filter driving motor 209 is used as a drive source for both the filter rotating means and the filter advance/retreat means, it is possible to further decrease the cost of the camera system and to realize a more compact camera.

Further, according to the second embodiment, the polarizing filter 203 is set to the rotated position (stored position) obtained when the light measurement output has taken the minimum value, or the rotated position of the polarizing filter 203 is controlled according to the setting of the degree of effect of the polarizing filter 203 by the filter-effect setting dial 222 on the basis of the rotated positions (stored positions) obtained when the light measurement outputs have taken the maximum value and the minimum value. Therefore, it is possible to automatically rotate the polarizing filter 203 to such a position as to obtain an apposite filter effect, thereby facilitating obtaining a correct exposure with ease.

Further, according to the second embodiment, in a case where the filter effect is little or it is preferable to have no filter effect, for example, when the maximum value of the light measurement is less than the predetermined value "A", when the difference between the maximum value and the minimum value of the light measurement is less than the predetermined value "B", or when the current photo-taking operation is made for the backlighting photography, the polarizing filter 203 is made to automatically retreat from the optical path of the photographic lens 202. Therefore, it is possible to surely prevent the amount of light usable for exposure from being wastefully reduced by the polarizing filter 203 or to surely prevent an under-exposed photograph from being taken.

Further, according to the second embodiment, when a normal photography other than a close-up photography is performed along with the flash emission, the polarizing filter 203 is made to retreat from the optical path of the photographic lens 202. Therefore, it is possible to surely prevent an under-exposed photograph from being taken notwithstanding the flash emission or to surely prevent energy from being wastefully consumed.

Further, when a close-up photography is performed along with the flash emission, the polarizing filter 203 is made to be set to such a position as to effectively cut off reflected light resulting from the flash emission. Therefore, it is possible to prevent the strong reflected light resulting from the flash emission from entering the optical path of the photographic lens 202, thereby enabling a good close-up flash photography to be performed.

In addition, in each of the first and second embodiments described above, there is explained a case where the optical filter is a polarizing filter.

However, there is a case where some optical filters other than the polarizing filter are effectively used as the optical filter. For example, an ND filter having a light-attenuating effect on the half side of the image plane thereof (the so-called half-ND filter), a gradation filter having the effect of gradually light-attenuating the image plane thereof serially, or the like is used.

Then, in order to realize a filter effect as desired by the photographer, a filter-effect setting means is provided with the respective rotated positions of the filter where the light-attenuating part is located on the upper portion of the image plane, the lower portion of the image plane, the right portion of the image plane and the left portion of the image plane, and the individual rotated positions of the filter are correlated with the respective filter effects. Then, the rotated position of the filter is controlled by electric driving in the similar way as described above.

Further, in the similar way as described above, the necessity and unnecessity of the filter may be automatically discriminated on the basis of a photo-taking condition to cause the filter by electrical driving to advance to and retreat from the optical path of the photographic lens.

Further, in each of the first and second embodiments described above, there is explained a case where the drive source is an electromagnetic motor. However, the driving force may be an electromagnetic actuator such as an electromagnet or a plunger, an electrostatic actuator, a piezoelectric element, an ultrasonic motor (vibration motor), or the like.

Further, in each of the first and second embodiments described above, there is explained a case where the advance/retreat action and the rotating action of the polarizing filter are effected by the driving force of one and the same drive source. However, the advance/retreat action and the rotating action of the polarizing filter may be independently effected by the respective driving forces of the separate drive sources.

Further, in each of the first and second embodiments described above, an explanation is made about a camera using a silver-halide film. However, the invention may be applied to an electronic still camera, a moving-image camera such as a video camera, or the like.

As has been described above, according to each of the first and second embodiments, since there is provided an electrically-driven filter rotating means, it is possible to dispense with a filter rotating operation by a manual operation, which is troublesome. In addition, since the filter and the filter rotating means are disposed in the camera body part in which a space can be easily secured in a direction perpendicular to the optical axis of the photographic lens, it is possible to prevent the increase in cost of the camera system or the failure of an external design of the camera.

Further, the optical filter is set to the rotated position obtained when the light measurement output has taken the minimum value, or the rotated position of the optical filter is controlled according to the setting of the degree of effect of the optical filter by the filter-effect setting means on the basis of the rotated positions obtained when the light measurement outputs have taken the maximum value and the minimum value. Therefore, it is possible to automatically rotate the optical filter to such a position as to obtain an apposite filter effect, thereby facilitating obtaining a correct exposure with ease.

Further, since there are provided the electrically-driven filter advance/retreat means and the electrically-driven filter rotating means, it is possible to dispense with a filter rotating operation or filter mounting/demounting operation by a manual operation, which is troublesome. In addition, since the filter, the filter advance/retreat means and the filter rotating means are disposed in the camera body part in which a space can be easily secured in a direction perpendicular to the optical axis of the photographic lens, it is possible to prevent the increase in cost of the camera system or the failure of an external design of the camera.

In addition, in this instance, if both the filter advance/retreat means and the filter rotating means are arranged to be driven by a single drive source and there is provided a driving-force switching means, such as a planetary mechanism, for selectively transmitting the driving force of the single drive source to one of the filter advance/retreat means and the filter rotating means, it is possible to further decrease the cost of the camera system and to realize a more compact camera.

Further, if the optical filter is made to retreat from the optical path of the photographic lens when the difference between the maximum value and the minimum value of the light measurement is less than a predetermined value, when the current photo-taking operation is made for the backlighting photography, or when the maximum value of the light measurement is less than a predetermined value, the optical filter is automatically caused to retreat from the optical path of the photographic lens in a case where the filter effect is little or it is preferable to have no filter effect. Therefore, it is possible to surely prevent the amount of light usable for exposure from being wastefully reduced by the optical filter or to surely prevent an underexposed photograph from being taken.

Further, since the optical filter is made to retreat from the optical path of the photographic lens when the light measurement result indicates a value less than a predetermined value, it is possible to surely prevent an under-exposed photograph from being taken with the optical filter used, in a case where a low-luminance object is photographed.

Further, since the optical filter is made to retreat from the optical path of the photographic lens when a normal photography other than a close-up photography is performed along with the flash emission, it is possible to surely prevent an under-exposed photograph from being taken or energy from being wastefully consumed due to the loss of the amount of flash light caused by the light-attenuating effect of the optical filter.

Further, when a close-up photography is performed along with the flash emission, the optical filter is made to enter the optical path of the photographic lens or is made to enter the optical path of the photographic lens and to be rotated to such a position as to effectively cut off reflected light resulting from the flash emission. Therefore, it is possible to prevent the strong reflected light resulting from the flash emission from entering the optical path of the photographic lens, thereby enabling a good close-up flash photography to be performed.

Further, when the photo-taking operation is performed with the optical filter inserted into the optical path of the photographic lens, the result of the distance measurement is appropriately modified by, for example, correcting the result of the distance measurement obtained when the optical filter has retreated. Therefore, it is possible to surely prevent a defocus on the object.

What is claimed is:

1. A camera having a camera body part and a lens barrel part, said camera comprising:

an optical filter contained in said camera body part and arranged to be rotatable around an axis of a lens optical path derived from said lens barrel part, said optical filter being movable into and out of said lens optical path; and filter rotating means contained in said camera body part and having a drive source for rotating said optical filter.

2. A camera according to claim 1, wherein said axis is substantially parallel with an optical axis of said lens barrel part.

3. A camera according to claim 1, further comprising operation means provided at said camera body part and operable for causing said filter rotating means to operate.

4. A camera according to claim 1, further comprising:

light measuring means for performing light measurement to measure luminance of an object field through said optical filter so as to obtain a light measurement result; and control means for setting a target rotated position of said optical filter in accordance with the light measurement result obtained by said light measuring means and for causing said filter rotating means to rotate said optical filter to the target rotated position.

5. A camera according to claim 4, wherein said control means causes said light measuring means to perform the light measurement while causing said filter rotating means to rotate said optical filter, and sets, as the target rotated position, a rotated position of said optical filter obtained when the light measurement result indicates a minimum value.

6. A camera according to claim 4, further comprising filter-effect setting means for setting a degree of effect of said optical filter, wherein said control means causes said light measuring means to perform the light measurement while causing said filter rotating means to rotate said optical filter, and sets a target rotated position of said optical filter corresponding to the degree of effect set by said filter-effect setting means, on the basis of rotated positions of said optical filter obtained respectively when the light measurement result indicates a maximum value and a minimum value.

7. A camera according to claim 1, wherein said optical filter is a polarizing filter.

8. A camera according to claim 1, wherein said optical filter is a filter a part of which has a light-attenuating effect.

9. A camera having a camera body part and a lens barrel part, said camera comprising:

an optical filter contained in said camera body part;

filter advance/retreat means contained in said camera body part and having a drive source for causing said optical filter to advance to and retreat from a lens optical path derived from said lens barrel part; and filter rotating means contained in said camera body part and having a drive source for rotating said optical filter having entered the lens optical path around an axis of the lens optical path.

10. A camera according to claim 9, wherein the drive source of said filter advance/retreat means and the drive source of said filter rotating means are separate from each other.

11. A camera according to claim 9, wherein the drive source of said filter advance/retreat means is used also as the drive source of said filter rotating means, said camera further comprising driving-force changeover means for selectively transmitting a driving force of the drive source to one of said filter advance/retreat means and said filter rotating means.

12. A camera according to claim 11, wherein said driving-force changeover means is a planetary mechanism.

13. A camera according to 9, further comprising:

light measuring means for performing light measurement to measure luminance of an object field through said optical filter so as to obtain a light measurement result; and control means for causing said filter advance/retreat means to operate, in accordance with the light measurement result obtained by said light measuring means.

14. A camera according to claim 13, wherein said control means causes said light measuring means to perform the light measurement while causing said filter rotating means to rotate said optical filter, and causes said filter advance/retreat means to cause said optical filter to retreat from the lens optical path, when a difference between a maximum value and a minimum value indicated by the light measurement result is less than a predetermined value.

15. A camera according to claim 13, wherein said control means causes said filter advance/retreat means to cause said optical filter to retreat from the lens optical path, when determining, from the light measurement result obtained by said light measuring means, that a current photo-taking operation is made in a backlighting condition.

16. A camera according to claim 13, wherein said control means causes said light measuring means to perform the light measurement while causing said filter rotating means to rotate said optical filter having entered the lens optical path, and causes said filter advance/retreat means to cause said optical filter to retreat from the lens optical path, when a maximum value indicated by the light measurement result is less than a predetermined value.

17. A camera according to claim 9, wherein said optical filter is a polarizing filter.

18. A camera according to claim 9, wherein said optical filter is a filter a part of which has a light-attenuating effect.

19. A camera comprising:

filter advance/retreat means for causing an optical filter to advance to and retreat from a lens optical path, said optical filter being rotatable about an axis of said lens optical path when advanced to said lens optical path;

light measuring means for performing light measurement to measure luminance of an object field through said optical filter so as to obtain a light measurement result; and control means for causing said filter advance/retreat means to cause said optical filter to retreat from the lens optical path, when the light measurement result obtained by said light measuring means indicates a value less than a predetermined value.

20. A camera according to claim 19, further comprising flash emitting means, wherein said control means causes said filter advance/retreat means to cause said optical filter to retreat from the lens optical path, when a photo-taking operation other than close-up photography is performed while causing said flash emitting means to emit flash light.

21. A camera according to claim 19, wherein said optical filter is a polarizing filter.

22. A camera according to claim 19, wherein said optical filter is a filter a part of which has a light-attenuating effect.

23. A camera comprising:

a lens adapted for close-up photography;

filter advance/retreat means for causing a polarizing filter to advance to and retreat from an optical path of said lens;

flash emitting means; and control means for causing said filter advance/retreat means to cause said polarizing filter to enter the optical path of said lens when causing said flash emitting means to emit flash light during the close-up photography.

24. A camera according to claim 23, wherein said polarizing filter is rotatable around an axis located inside the optical path of said lens in a state in which said polarizing filter has entered the optical path of said lens.

25. A camera comprising:

a lens adapted for close-up photography;

filter rotating means for rotating a polarizing filter around an axis of an optical path of said lens;

flash emitting means; and control means for, when causing said flash emitting means to emit flash light during the close-up photography, causing said filter rotating means to cause said polarizing filter to rotate to such a position as to cut off reflected light from an object field resulting from flash emission.

26. A camera comprising:

a lens adapted for close-up photography;

filter advance/retreat means for causing a polarizing filter to advance to and retreat from an optical path of said lens;

filter rotating means for rotating said polarizing filter around an axis of the optical path of said lens;

flash emitting means; and control means for, when causing said flash emitting means to emit flash light during the close-up photography, causing said filter advance/retreat means to cause said polarizing filter to enter the optical path of said lens and causing said filter rotating means to cause said polarizing filter to rotate to such a position as to cut off reflected light from an object field resulting from flash emission.

27. A camera comprising:

an optical filter capable of advancing to and retreating from an optical path of a lens, said optical filter being rotatable about an axis of said lens optical path when advanced to said lens optical path;

focus adjusting means for driving said lens to adjust focus in accordance with a result of distance measurement for an object; and distance measuring means for making a result of distance measurement for an object having a given distance different in accordance with an advancing/retreating state of said optical filter with respect to the optical path.

28. A camera according to claim 27, wherein said distance measuring means performs a distance measuring operation by using light having passed through an optical path different from the optical path of said lens.

29. A camera according to claim 27, wherein, when said optical filter has entered the optical path of said lens, said control means makes a correction to a result of distance measurement obtained when said optical filter has retreated from the optical path of said lens.

30. A camera having a camera body part and lens barrel part, said camera comprising:
   a) located within said camera body part an optical filter;
   b) filter advance/retreat means for causing said optical filter to advance to and retreat from a lens optical path;
   c) light measuring means for performing light measurement to measure luminance of an object field through said optical filter so as to obtain a light measurement result; and
   d) control means for causing said filter advance/retreat means to cause said optical filter to retreat from the lens optical path, when the light measurement result obtained by said light measuring means indicates a value less than a predetermined value.

31. A camera according to claim 30, further comprising flash emitting means,
   wherein said control means causes said filter advance/retreat means to cause said optical filter to retreat from the lens optical path, when a photo-taking operation other than close-up photography is performed while causing said flash emitting means to emit flash light.

* * * * *

UNITED STATES PATENT AND TRADEMARK OFFICE
CERTIFICATE OF CORRECTION

PATENT NO.    : 6,137,958
DATED         : October 24, 2000
INVENTOR(S)   : Yasuhiro Toyoda Page 1 of 1

It is certified that error appears in the above-identified patent and that said Letters Patent is hereby corrected as shown below:

Column 1,
Lines 33 and 36, delete "poralizing" and insert -- polarizing --.

Column 11,
Line 36, delete "grater than" and insert -- greater than --.

Column 23,
Line 45, delete "grater than" and insert -- greater than --.

Column 28,
Line 20, "However, there is a case ..." does not begin as a new paragraph.
Line 27, "Then, in order to ..." does not begin as a new paragraph.

Column 30,
Line 52, "wherein said control ..." should begin as a new paragraph.

Signed and Sealed this

Eighteenth Day of December, 2001

Attest:

Attesting Officer

JAMES E. ROGAN
Director of the United States Patent and Trademark Office